(12) United States Patent
Burns

(10) Patent No.: US 8,480,381 B2
(45) Date of Patent: Jul. 9, 2013

(54) WAVE ENERGY CONVERSION

(75) Inventor: Alan Robert Burns, Dalkeith (AU)

(73) Assignee: CETO IP Pty Ltd., West Perth, Western Australia (AU)

( * ) Notice: Subject to any disclaimer, the term of this patent is extended or adjusted under 35 U.S.C. 154(b) by 674 days.

(21) Appl. No.: 12/063,556

(22) PCT Filed: Aug. 17, 2006

(86) PCT No.: PCT/AU2006/001187
§ 371 (c)(1),
(2), (4) Date: May 17, 2010

(87) PCT Pub. No.: WO2007/019640
PCT Pub. Date: Feb. 22, 2007

(65) Prior Publication Data
US 2010/0219065 A1    Sep. 2, 2010

(30) Foreign Application Priority Data

Aug. 17, 2005  (AU) ................................ 2005904436

(51) Int. Cl.
*F04B 17/00* (2006.01)
*F04B 39/10* (2006.01)
(52) U.S. Cl.
USPC .............................. 417/331; 417/330; 417/547
(58) Field of Classification Search
USPC .......................................... 417/330–332, 547
See application file for complete search history.

(56) References Cited

U.S. PATENT DOCUMENTS

| 25,208 A | * | 8/1859 | May .............................. 417/547 |
| 644,093 A | * | 2/1900 | Place ........................... 417/331 |

(Continued)

FOREIGN PATENT DOCUMENTS

| FR | 2 257 774 | 8/1975 |
| FR | 2 258 774 | 9/1975 |

(Continued)

OTHER PUBLICATIONS

Office Action dated Nov. 29, 2012 for Korean Patent Application No. 10-2008-7006116 and English translation thereof, 13 pgs.

(Continued)

Primary Examiner — Charles Freay
(74) Attorney, Agent, or Firm — Merchant & Gould P.C.

(57) ABSTRACT

Apparatus (10) for harnessing ocean wave energy and for converting the harnessed energy to high pressure sea water, typically above 100 psi and preferably above 800 psi. The high pressure seawater generated by the apparatus (10) can be piped to shore for use in any appropriate purpose. The apparatus (10) comprises a float (12) buoyantly suspended within the body of seawater (1) and a pump (13) operatively connected to the float (12). The pump (13) comprises an intake chamber (47), a discharge chamber (49) and a piston (61) extending between the intake and discharge chambers (47, 49). The piston (61) comprises a tube (63) having a flow passage (102) extending between the intake and discharge chambers (47, 49). The piston (61) and discharge chamber (49) cooperate to define a pumping chamber (100) adapted to undergo expansion and contraction in response to reciprocatory motion of the piston. The piston (61) is operatively connected to the float (12) to be driven by upward movement of the float. The pump may have provision for treatment of the seawater which it delivers through use of an electrolysis process receiving electric current from a linear current generator incorporated in the pump.

36 Claims, 30 Drawing Sheets

U.S. PATENT DOCUMENTS

| | | | |
|---|---|---|---|
| 3,126,830 A | | 3/1964 | Dilliner |
| 4,091,618 A * | | 5/1978 | Jackson ............ 60/497 |
| 4,539,485 A | | 9/1985 | Neuenschwander |
| 4,563,248 A * | | 1/1986 | Anderson ............ 203/10 |
| 5,167,786 A | | 12/1992 | Eberle |
| 5,394,695 A * | | 3/1995 | Sieber ............ 60/398 |
| 5,473,892 A * | | 12/1995 | Margittai ............ 60/398 |
| 5,499,889 A | | 3/1996 | Yim |
| 5,701,740 A * | | 12/1997 | Tveter ............ 60/505 |
| 5,975,865 A | | 11/1999 | Manabe |
| 6,768,216 B1 | | 7/2004 | Carroll et al. |
| 2004/0251692 A1 | | 12/2004 | Leijon et al. |
| 2010/0034670 A1 * | | 2/2010 | Smith ............ 417/53 |

FOREIGN PATENT DOCUMENTS

| | | |
|---|---|---|
| FR | 2 390 551 | 12/1978 |
| JP | 11018616 | 1/1999 |
| WO | WO 01/06119 | 1/2001 |
| WO | WO 2004/003380 | 1/2004 |
| WO | WO 2004/090324 | 10/2004 |

OTHER PUBLICATIONS

Office Action dated Sep. 24, 2009 for related New Zealand Patent Application No. 566383, 2 pgs.

Office Action dated Jan. 17, 2011 for related New Zealand Patent Application No. 566383, 2 pgs.

Office Action dated Feb. 24, 2012 for related Australian Patent Application No. 2006282000, 2 pgs.

Office Action dated Dec. 6, 2011 for related Japanese Patent Application No. 2008-526329 and English translation thereof, 5 pgs.

Office Action dated Nov. 2, 2012 for related Japanese Patent Application No. 2008-526329 and English translation thereof, 6 pgs.

Office Action dated Jan. 31, 2011 for related Israeli Patent Application No. 189427, 2 pgs.

Office Action dated Dec. 29, 2011 for related Israeli Patent Application No. 189427, 1 pg.

Office Action dated Jul. 15, 2011 for related Colombian Patent Application No. 08 016222, 3 pgs.

Office Action dated Jun. 15, 2012 for related Colombian Patent Application No. 08 016222, 6 pgs.

Office Action dated Jul. 10, 2009 for related Chinese Patent Application No. 200680038613.8 and English translation thereof, 6 pgs.

Office Action dated Mar. 5, 2012 for related Chinese Patent Application No. 200680038613.8 and English translation thereof, 6 pgs.

Office Action dated Jul. 25, 2012 for related Chinese Patent Application No. 200680038613.8 and English translation thereof, 5 pgs.

Office Action dated Jan. 28, 2013 for related Chinese Patent Application No. 200680038613.8 and English translation thereof, 4 pgs.

International Search Report for PCT/AU2006/001187 dated Nov. 30, 2006, 6 pgs.

Office Action from corresponding Canadian Application No. 21,619,100 mailed Mar. 6, 2013 (3 pages).

\* cited by examiner

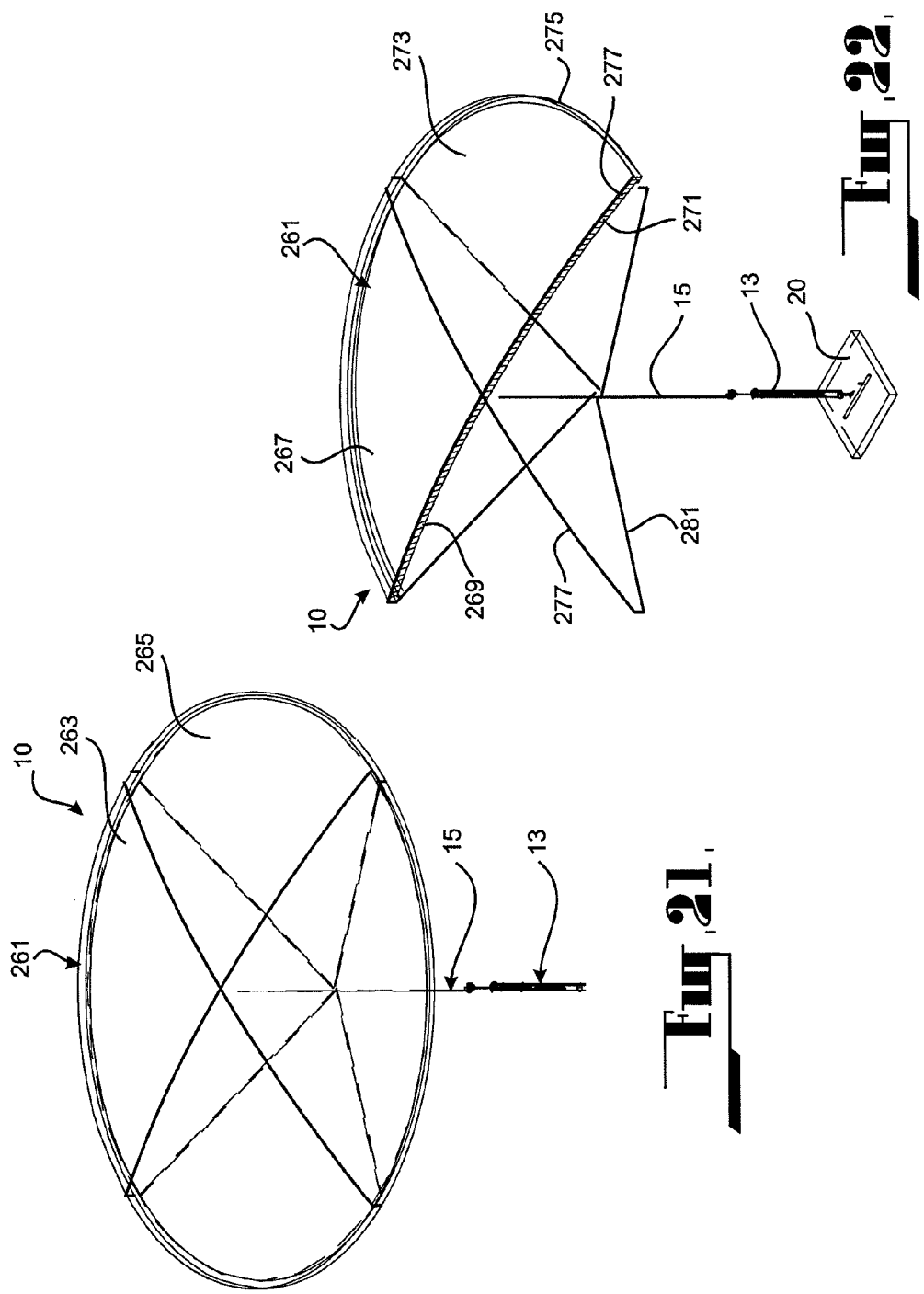

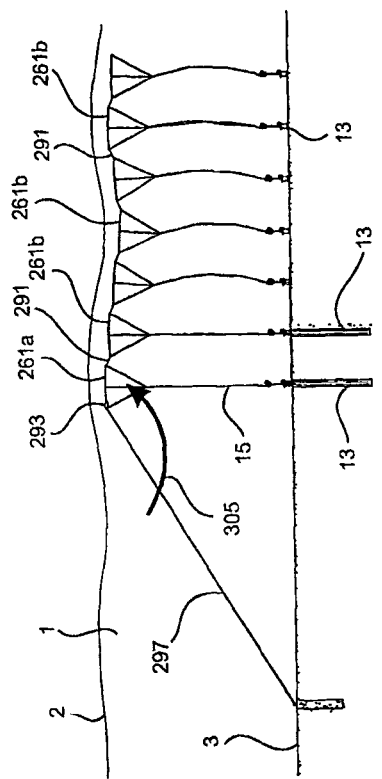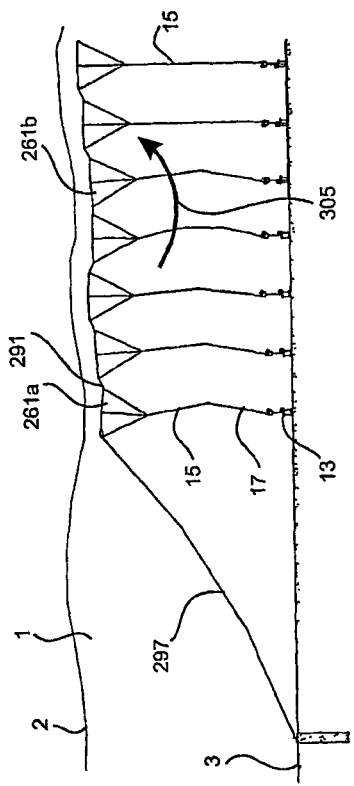

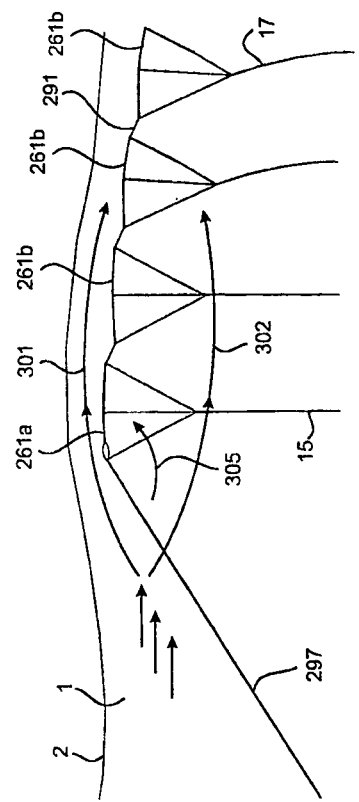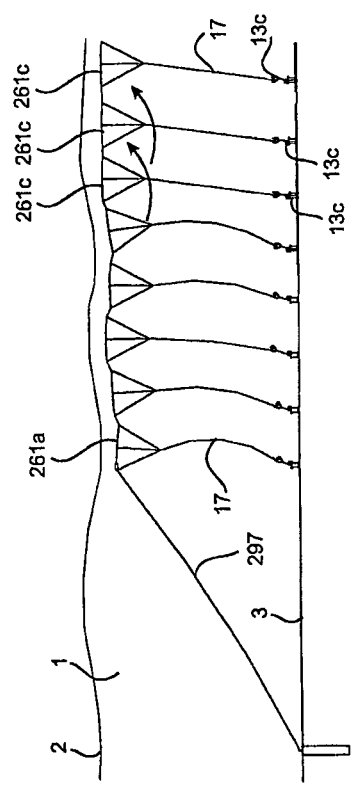

US 8,480,381 B2

WAVE ENERGY CONVERSION

FIELD OF THE INVENTION

This invention relates to conversion of wave energy in a body of water into a form which can perform useful work.

The invention has been devised particularly, although not necessarily solely, for harnessing wave energy and converting the harnessed wave energy to pressurised fluid for use in any appropriate way. The fluid may comprise water drawn from the body of water itself. Where the body of water comprises an ocean, seawater drawn from the ocean may be piped under high-pressure to shore for use. The high-pressure seawater may, for example, be used to drive a turbine and the shaft power from the turbine used to generate electricity. Alternatively, the high-pressure seawater may be fed to a reverse osmosis desalination unit to yield fresh water. In such an arrangement, the salt water concentrate exiting the desalination unit, which is still under pressure, may be fed to a turbine and the shaft power used to generate electricity.

BACKGROUND ART

There have been many proposals for devices that seek to harness ocean wave energy, with some of the devices operating at the water surface and others under water.

Devices operating under water typically involve a moveable element such as a diaphragm adapted to deflect in response to wave action. An example of such a device is disclosed in WO 2004/003380. The device rests on the seabed and comprises a body structure having a diaphragm adapted to deflect in response to wave energy. A working chamber is disposed immediately below the diaphragm and contains a compressible fluid, conveniently air. The compressible fluid is under pressure to provide a lifting force to counter-balance the weight of the diaphragm and any attachments thereto, as well as the seawater above the diaphragm. The upper surface of the diaphragm is exposed to seawater. The diaphragm is operably connected to a reciprocating pump, whereby deflection of the diaphragm causes operation of the reciprocating pump.

With such an arrangement, it is necessary to provide a structure on the seabed, with the structure incorporating the diaphragm and a working chamber containing a compressible fluid below the diaphragm. Such a structure can be relatively expensive to construct and maintain.

It is against this background that the present invention has been developed.

DISCLOSURE OF THE INVENTION

According to a first aspect of the invention there is provided apparatus for capturing wave energy in a body of water having a water surface, the apparatus comprising means responsive to wave disturbances in the body of water, a reciprocating pump within the body of water, the reciprocating pump comprising a body defining a cavity, a piston slidably and sealingly mounted with respect to the body for reciprocal movement with respect to the cavity, the piston and the cavity cooperating to define a pumping chamber adapted to undergo expansion and contraction in response to reciprocatory movement of the piston with respect to the cavity, a flow passage within the piston, the flow passage having an inlet for receiving water from the body of water, and an outlet for discharging the received water into the discharge chamber, whereby water is drawn into the pumping chamber upon volume expansion thereof and is discharged from the pumping chamber upon volume reduction thereof, the reciprocating pump being operably coupled to said means to be driven by upward movement of said means to undergo a first stroke.

Preferably, said means responsive to wave disturbances in the body of water is submerged in the body of water.

Preferably, the reciprocating pump is adapted to undergo a second (return) stroke under the influence of gravity.

Preferably, the first stroke comprises a pumping stroke and the second (return) stroke comprises an intake stroke.

Preferably, the reciprocating pump is adapted to receive water from the body of water during the intake stroke thereof and to deliver the received water under pressure during the pumping stroke thereof.

Preferably, the body defines an intake chamber below the piston into which the piston plunges upon volume expansion of the discharge chamber, the intake chamber being adapted to receive water from a source communicating with the intake chamber.

The intake chamber may receive water in any appropriate way. In one arrangement, the intake chamber may communicate with a water source by way of a water delivery line. In another arrangement, the intake chamber may have a wall which is pervious to water. The wall may incorporate perforations such as slots. Preferably, the perforations are of a size which allows entry of water while substantially excluding particulate material such as sand. The wall may separate the intake chamber from a filtering medium providing filtration to water entering the intake chamber. Typically, the filtration medium comprises saturated sand. The saturated sand may be accommodated in a containment chamber in communication with a body of water.

Typically, the water comprises seawater, in which case the body of water would comprise the sea.

Preferably, the pump is anchored to the floor of the body of water. The pump may be anchored rigidly to the floor, or may be anchored for angular movement relative to the floor. In the latter case, the pump may be tethered to the floor. The pump may be so tethered by a single tether line which may incorporate a pivot and a swivel.

In another arrangement, the pump may be embedded in the sea floor. With this arrangement, saturated sand in the sea floor may provide filtration to water entering the intake chamber.

Preferably, said means responsive to wave disturbances in the body of water is located within the body of water and presents a first face exposed to the body of water and directed towards the water surface, and a second face exposed to the body of water and directed away from the water surface.

The means responsive to wave disturbances may be at or near the water surface or submerged in the body of water.

Preferably, the means responsive to wave disturbances is buoyant within the body of water.

Preferably, said means responsive to wave disturbances comprises a float. Alternatively, it may comprise a canopy.

Preferably, the pump comprises a pump body defining an intake chamber and a discharge chamber, the piston extending between the piston chamber and the discharge chamber, the piston being mounted for reciprocation to co-operate with the discharge chamber to define the pumping chamber, with the volume of the pumping chamber varying upon reciprocating motion of the piston.

Preferably, the intake chamber and discharge chamber are separated by a partition, the piston passing through the partition and being supported for sliding and sealing engagement therewith.

Preferably, a seal structure is provided between the piston and the partition.

The seal structure may comprise a first seal in sliding and sealing engagement with the piston and a second seal in sliding and sealing engagement with the piston, and a fluid cavity between the two seals into which any fluid leakage may accumulate.

Preferably, the piston comprises a piston tube having an end opening onto the intake chamber and an end opening onto the discharge chamber, and valve means associated with the piston permitting entry of water into the hollow piston during an intake stroke of the piston while restricting return flow of the fluid through said end during the pumping stroke of the piston.

Preferably, the valve means may comprise a check valve associated with said end of the piston.

Preferably, the piston is linked to said means responsive to wave disturbances by a lifting mechanism. The lifting mechanism may comprise a rigid lift rod extending between said means responsive to wave disturbances and a lift head accommodated in the cavity, the lift head being operatively coupled to the piston.

Preferably, a covering is provided about that portion of the rigid lift rod which extends into and retracts from the pump body during reciprocation of the piston.

The covering may comprise an extensible sheath extending between the pump body and a portion of the lift rod.

Where the mean responsive to wave disturbances comprises a canopy, there may be a plurality of such canopies arranged in an array, with adjacent canopies connected together. Preferably, the interconnection between adjacent canopies may comprise a flexible connector. The array may comprise canopies arranged in a line extending in the direction of wave travel. The array may further comprise canopies arranged in a line extending transversely of the direction of wave travel.

In another arrangement, the body may comprise a sheet extending in the direction of wave travel, the sheet having opposed sides one of which defines the upper face and the other of which defines the lower face. Preferably, the sheet is of flexible yet inextensible material.

The sheet may be configured as a strip. There may be a plurality of such strips positioned in side-by-side relation.

Preferably, the pump has provision to provide treatment to the water delivered by the pump; the treatment may, for example, comprise chlorination. In this regard, the pump may be provided with an electrolytic cell to which current is supplied by a linear electric generator operable in response to reciprocation of the pump. The electrolytic cell is contacted by water in the pump and the resultant electrolytic action results in the production of a treatment agent such as chlorine.

The linear electric generator may comprise an armature defined by the piston of the pump and a stator associated with the armature, reciprocation of the piston providing the relative movement between the armature and the stature to generate an electrical current. The stator may be associated with the armature by being positioned therearound.

Preferably, a buoyancy float is provided on the upper end section of the pump body. The buoyancy float may comprise a bladder structure inflated by air. Preferably, the bladder is structure is so configured as to provide a righting moment to the pump.

In one arrangement, the bladder structure is of ellipsoidal configuration.

According to a further aspect of the invention there is provided a reciprocating pump comprising an electrolytic cell, a linear electric generator operable to provide current to the electrolytic cell for an electrolytic action on at least a portion of water received by the pump, the linear electric generator being operable in response to reciprocation of the pump.

Preferably, the pump comprises a piston, a part of the piston defining an armature for the linear electric generator, and a stator associated with the armature, whereby reciprocation of the piston causes movement of the armature linearly with respect to the stature to generate electrical current.

BRIEF DESCRIPTION OF THE DRAWINGS

The invention will be better understood by reference to the following description of several specific embodiments thereof as shown in the accompanying drawings in which:

FIG. 21 is a schematic perspective view of the apparatus of FIG. 19;

FIG. 22 is also a schematic perspective view of the apparatus of FIG. 19, with the exception that part of the canopy is cut away;

FIG. 23 is a schematic elevational view of apparatus according to a still further embodiment showing operation of the apparatus when a wave impinges on its leading edge;

FIG. 24 is a view similar to FIG. 23, with the exception that the apparatus is shown in operation at a later stage of wave travel;

FIG. 25 is a fragmentary perspective view of the apparatus, illustrating in particular splitting of the energy flow into upper and lower fluxes;

FIG. 26 illustrates operation of the apparatus in response to a large amplitude incident wave;

BEST MODE(S) FOR CARRYING OUT THE INVENTION

Figure 1:
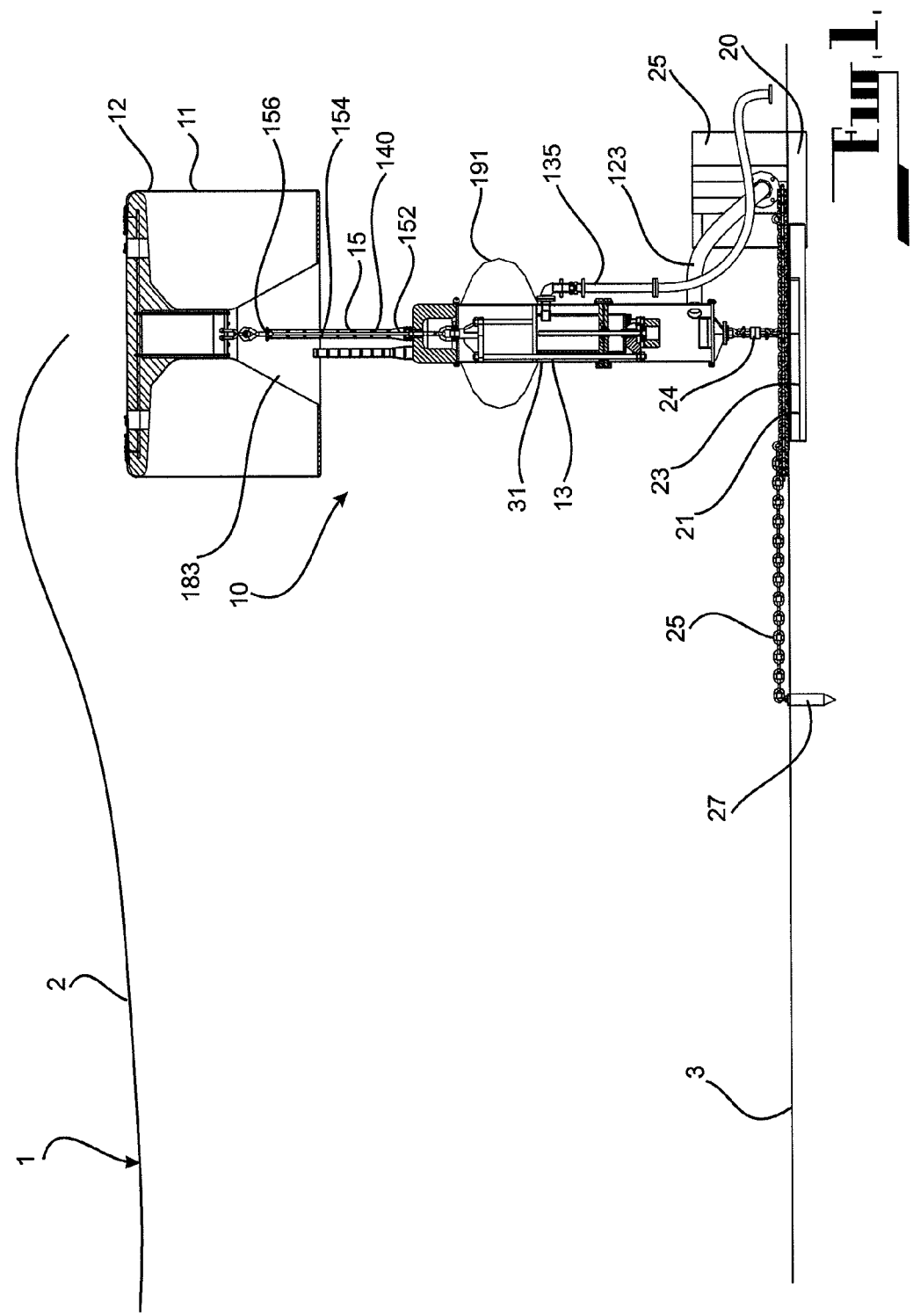
FIG. 1 is a schematic view of apparatus according to the first embodiment installed in position under water.
Figure 2:
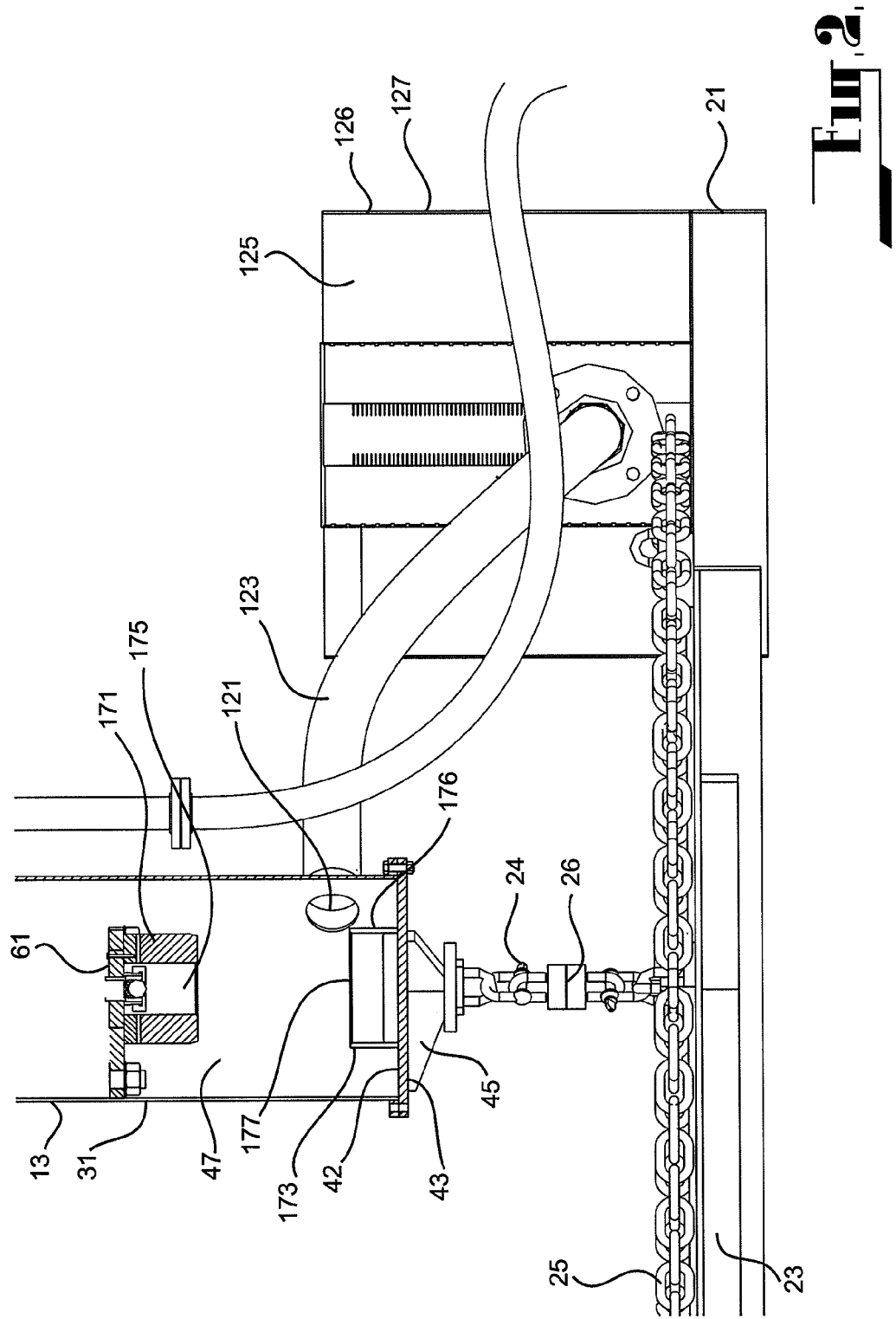
FIG. 2 is a schematic fragmentary view of a lower part of a reciprocating pump forming part of the apparatus.
Figure 3:
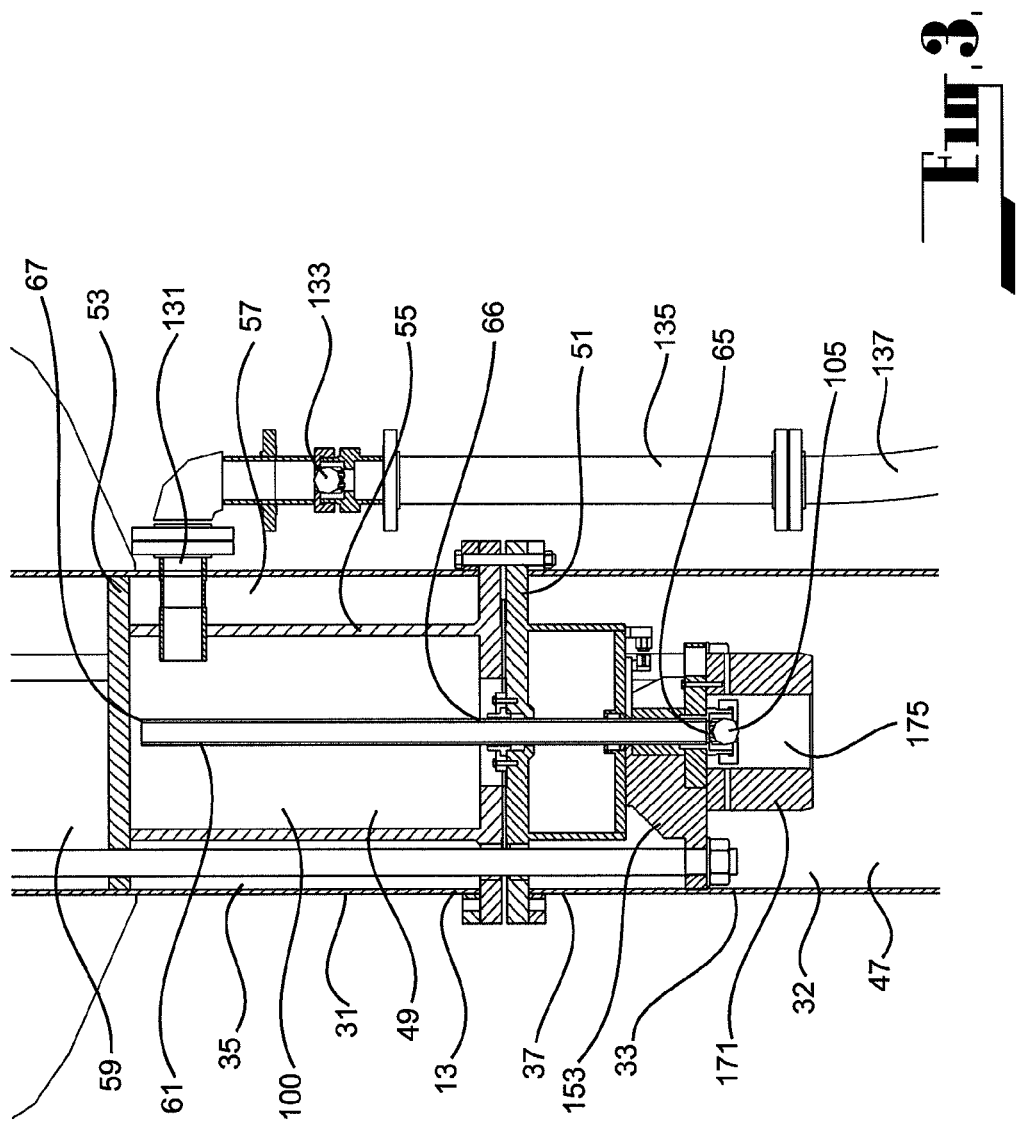
FIG. 3 is a schematic fragmentary view of an intermediate part of the pump, showing in particular an intake chamber, a discharge chamber and a piston extending therebetween.
Figure 4:
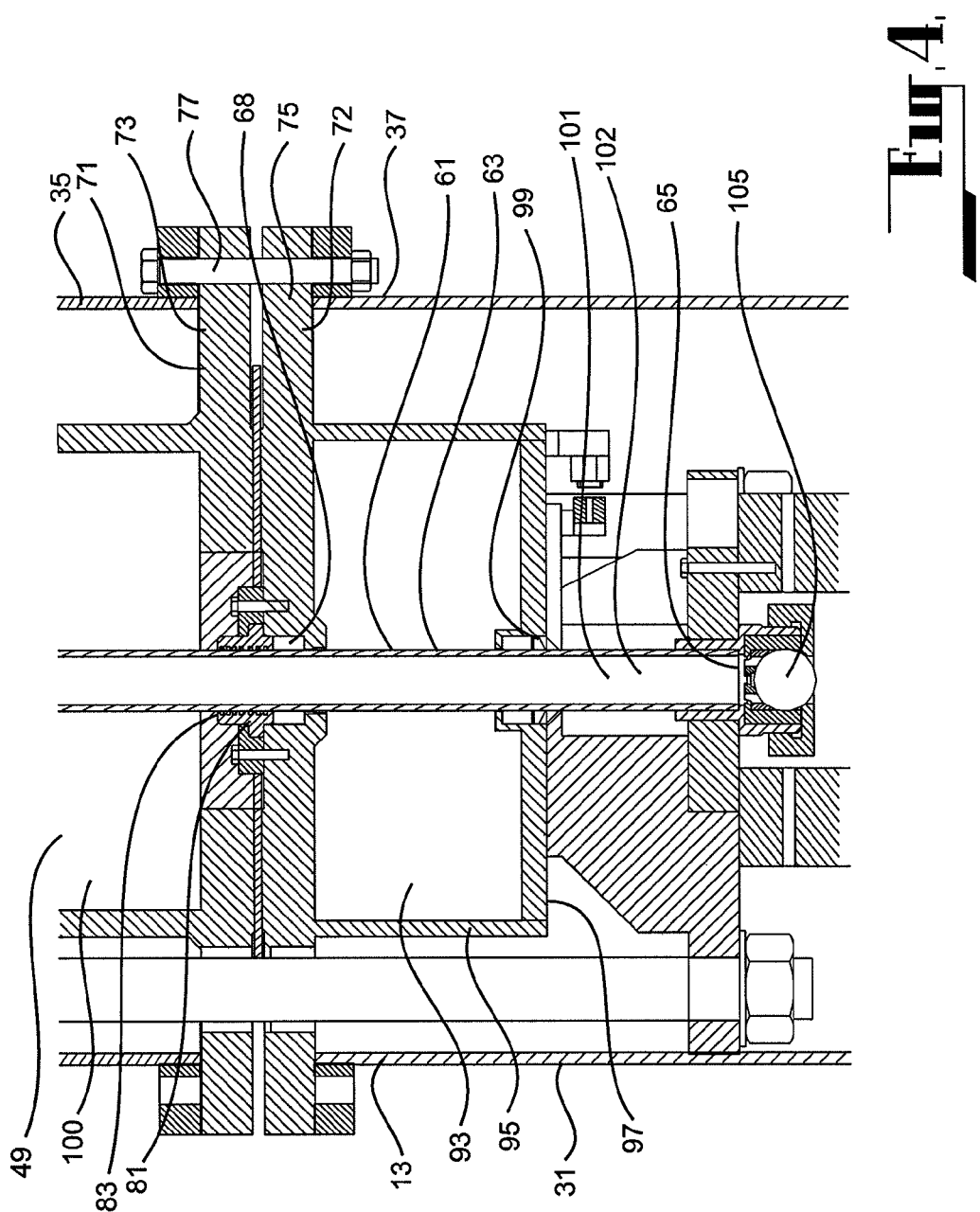
FIG. 4 is a fragmentary view, on an enlarged scale, showing a partition between the intake chamber and the discharge chamber and a sealing structure providing sliding and sealing engagement between the piston and the partition wall.
Figure 5:
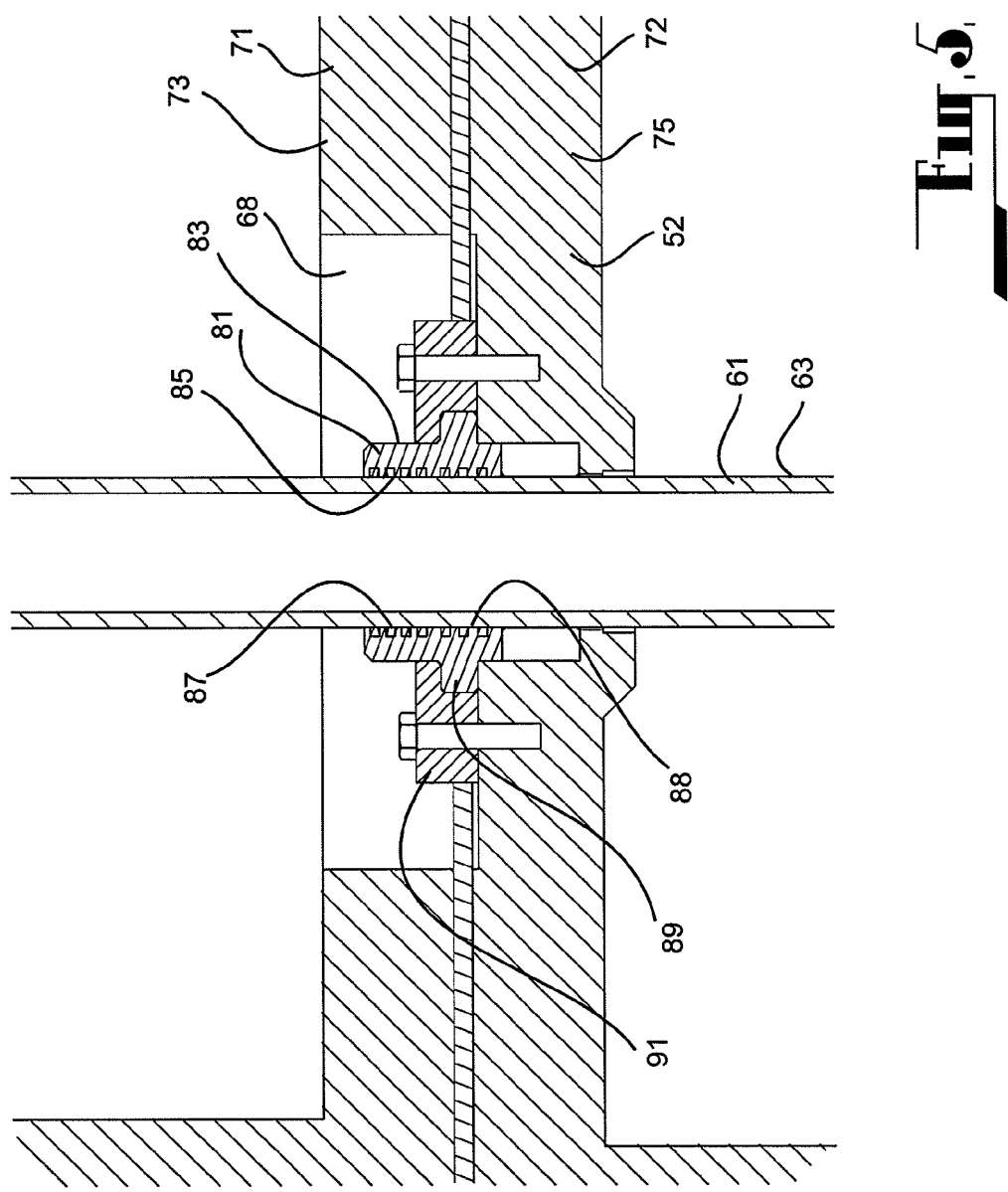
FIG. 5 is a detailed view of part of the sealing structure of FIG. 4.
Figure 6:
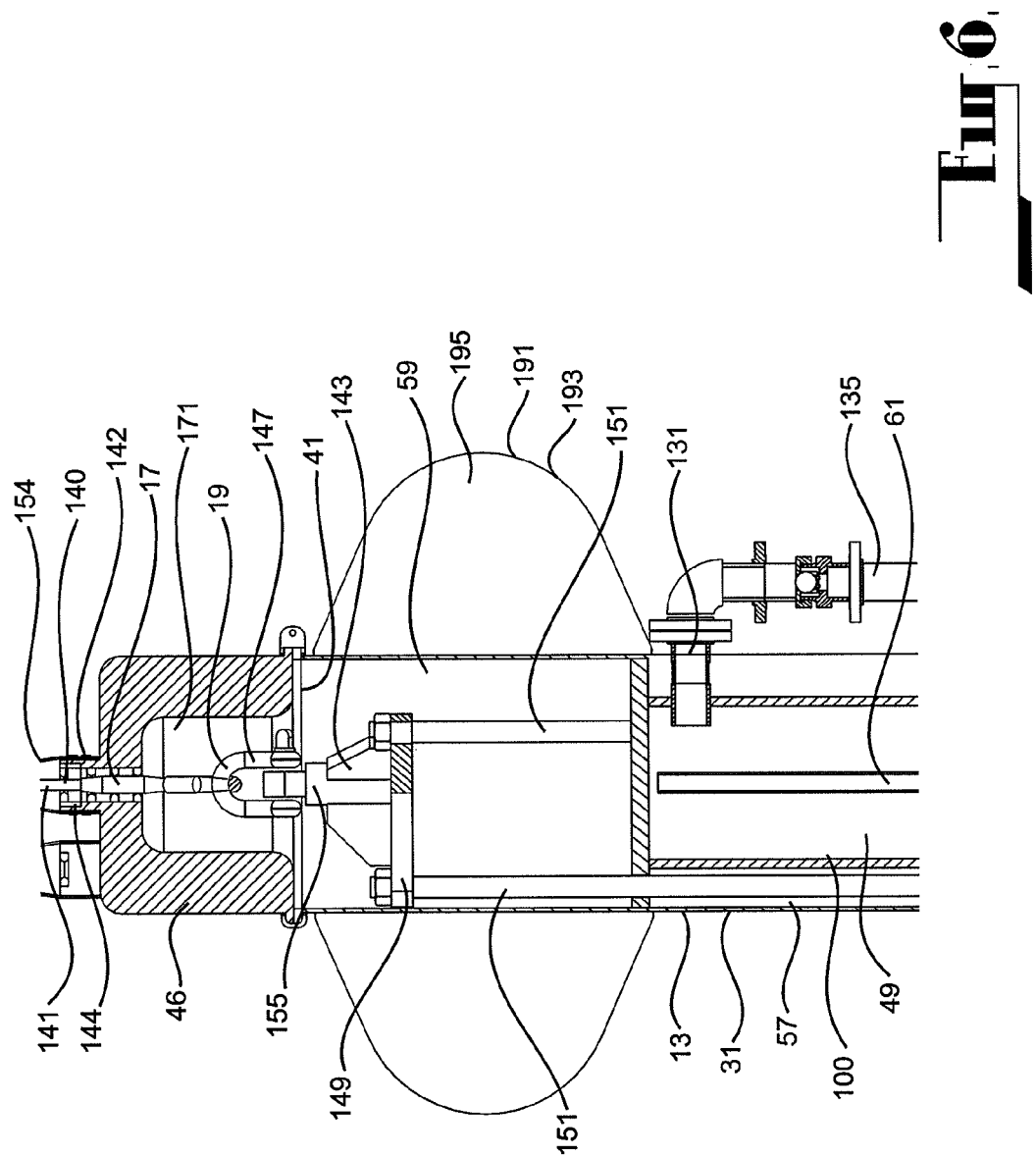
FIG. 6 is a schematic fragmentary view of an upper part of the pump.
Figure 7:
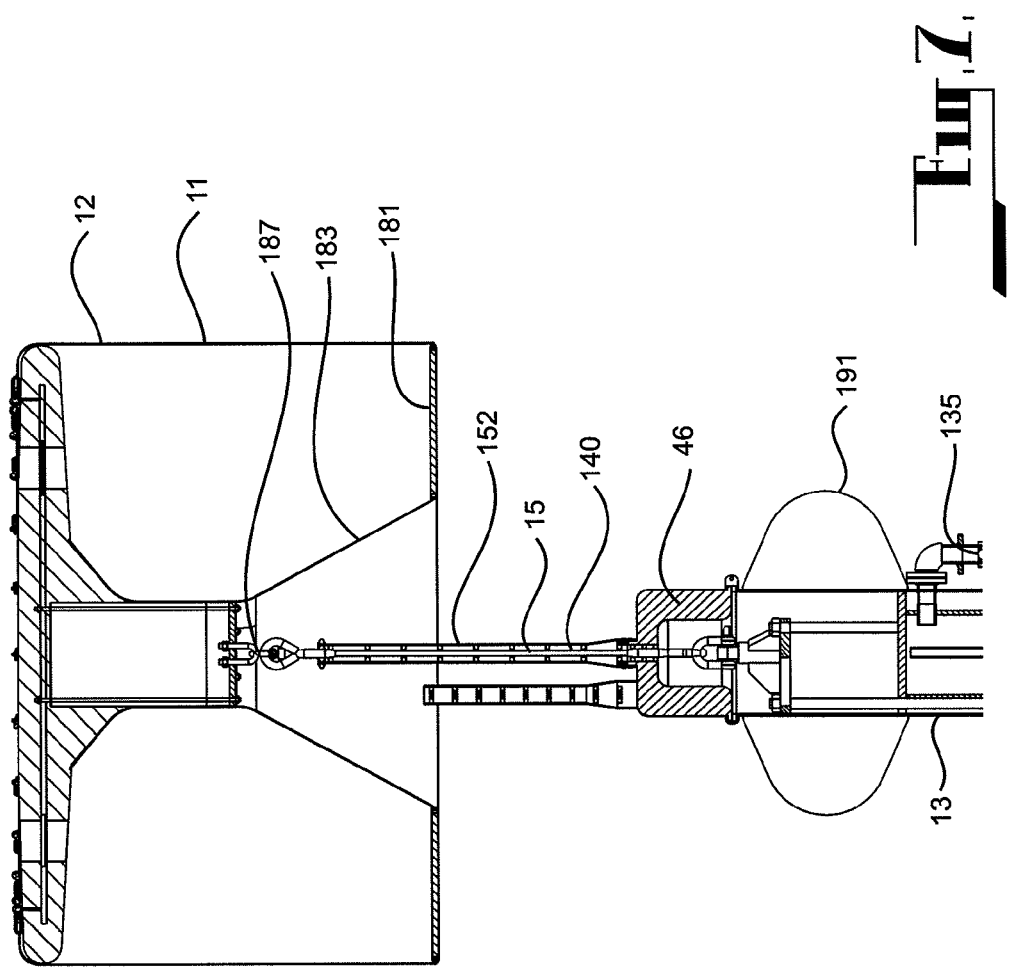
FIG. 7 is a schematic fragmentary view showing the upper part of the pump, a float and a connection between the float and the pump.
Figure 8:
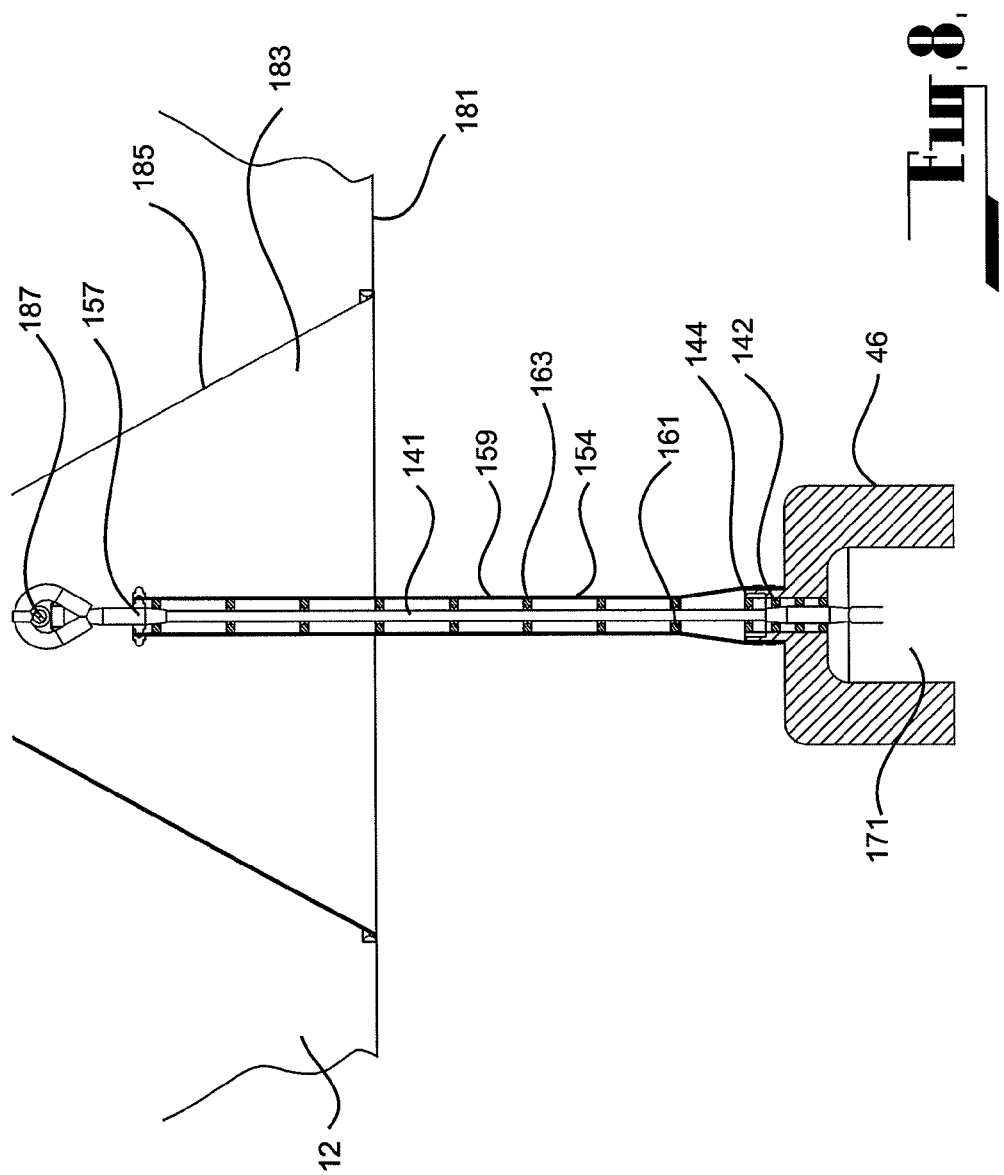
FIG. 8 is a detailed view of the connection between the pump and the float.

The embodiments shown in the drawings are each directed to apparatus for harnessing ocean wave energy and for converting the harnessed energy to high-pressure seawater, typically above 100 psi and preferably above 800 psi. High-pressure seawater generated by the apparatus can be piped to shore for use in any appropriate purpose. In one application, the high-pressure seawater is used as a motor fluid to drive a turbine, with the shaft power therefrom being used to generate electricity. In another application, the high-pressure seawater may be fed to a reverse osmosis desalination unit from which fresh water can be generated. The salt water concentrate from the desalination unit, which is still at high-pressure, may then be fed to a turbine for extraction of mechanical energy. The spent salt water concentrate can then be returned to the ocean if desired.

Each embodiment will be described and illustrated as being installed and operating in a body of seawater 1 having a water surface 2 and a seabed 3 which typically comprises sand.

Referring now to FIGS. 1 to 8, the apparatus 10 according to the first embodiment comprises means 11 responsive to water disturbances and a pump 13 operatively connected to said means 11. The pump 13 is anchored with respect to the seabed 3 and the means 11 comprises a float 12 buoyantly suspended within the body of seawater 1 above the pump 13 but typically below the water surface 2. The float 12 is operatively connected to the pump 13 by way of a coupling 15 which includes a tether 17. The tether 17 incorporates a section 19 which provides a pivot joint.

The pump 13 is anchored to the seabed 3 by anchoring means 20 providing an anchoring force substantially exceeding the upward tugging force of buoyancy, and the dynamic upthrust due to the wave motion acting on the float 12. In this embodiment, the anchoring means 20 comprises a base 21 embedded in the seabed 3. The base 21 has a plate 23 to which the pump 13 is attached by a linkage 24. The linkage 24 incorporates a section 26 which provides a swivel and pivot joint. With this arrangement, the pump 13 can sway angularly with respect to the seabed 3 in any sideways direction. The extent of angular sideways movement of the pump 13 is determined by a combination of factors such as the buoyancy of the float 12, the sea state and any subsidiary restraint that might be provided to the pump. The plate 23 may be configured as a suction anchor. The anchoring means 20 further comprises an anchoring chain 25 extending between the plate 23 and an anchor 27 embedded in the seabed 3.

The pump 13 comprises an elongated body 31 of tubular construction having interior 32. In this embodiment, the elongate body 31 is of circular cross-section. The elongate body 31 has an exterior sidewall 33, which in this embodiment is formed as an upper side wall section 35 and a lower side wall section 37 connected together.

The body 31 has an upper end 41 which is open and a lower end 42 which is closed by a lower wall 43. The lower wall 43 incorporates a fitting 45 to which the linkage 24 is attached.

The pump body 31 further comprise cap structure 46 is fitted onto the upper end 41 to close the interior 32 of the body 31.

An intake chamber 47 and a discharge chamber 49 are defined within the interior 32 of the body 31. The intake chamber 47 is defined between the lower wall 43 and a lower internal partition 51 within the interior 32. The discharge chamber 49 is defined between the lower internal partition 51, an upper internal partition 53 within the interior 32, and a cylindrical interior side wall 55 extending between the two partition walls. The interior side wall 55 is spaced inwardly from the exterior side wall 33 of the body such that an annular space 57 is defined therebetween. With this arrangement, a cavity 59 is also defined within the interior 32 between the upper internal partition 53 and the upper end 41.

A piston 61 extends between the intake chamber 47 and the discharge chamber 49. The piston 61 is of hollow construction and is configured as a tube 63 with one end 65 communicating with the intake chamber 47 and the other end 67 communicating with the discharge chamber 49.

The piston tube 63 passes through an opening 66 in the lower partition 51 to extend between the intake chamber 47 and the discharge chamber 49. A seal structure 68 provides a fluid seal around the piston tube 63 between the intake chamber 47 and the discharge chamber 49.

The lower partition 51 is defined by two wall sections 71, 72, with one wall section 71 defined by a flange 73 on the lower end of upper side wall section 35 and the other wall section 72 defined by a flange 75 on the upper end of the lower side wall section 37. A bolted connection 77 is provided between the two flanges 73, 75.

The seal structure 68 comprises a high pressure bush seal 81 accommodated in a seal cavity 83 within the two wall sections 71, 72 defining the lower partition 51. The bush seal 81 surrounds the piston tube 63 and presents a seal face 85 for sliding and sealing engagement with the piston tube. The seal face 85 incorporates a plurality of axially spaced grooves 87 defined between internal ribbing 88. The groves 87 allow lubrication and also increase the path length of any aspiring fluid leak. The bush seal 81 has a peripheral rib 89 which is engaged by a clamping ring 91 attached to flange 75 to retain the bush seal in position in the cavity 83.

The seal structure 68 further comprises a sealed cavity 93 defining a leakage chamber adjacent the bush seal 81 on the side thereof corresponding to the intake chamber 47. The sealed cavity is defined between flange 75, a cylindrical side wall 95 depending therefrom and an end wall 97 in opposed relation to the flange 75. The end wall 97 accommodates a secondary high pressure seal 99 in sliding and sealing engagement with the piston tube 63. With this arrangement, any leakage past the bush seal 81 is retained in the sealed cavity 93.

The piston tube 63 has a bore 101 extending axially therethrough to provide a chamber 102 within the piston 61. At the end 65, the piston chamber 102 communicates with the intake chamber 47 and at end 67 the chamber 102 communicates with the discharge chamber 49. A check valve 105 is associated with the end 65 of the piston chamber 102 to allow flow into the piston chamber 102 upon a downstroke of the piston 61 while preventing flow in the reverse direction upon upstroke of the piston.

The discharge chamber 49 and the piston chamber 102 cooperate to define a pumping chamber 100.

The pump 13 has an inlet 121 opening onto the intake chamber 47. The inlet 121 receives feed seawater by way of inlet line 123. The feed seawater is filtered by filter system 125 prior to delivery to the intake chamber 47 by way of the inlet line 123. The filter system 125 comprises a sand and gravel filter 126 accommodated in a housing 127 mounted on the base 21. The water inlet line 123 is flexible to accommodate angular movement of the pump as previously described.

The discharge chamber 49 has an outlet 131 incorporating a check valve 133 arranged to allow flow under pressure outwardly from the discharge chamber 49 while preventing return flow. The outlet 131 communicates with a discharge line 135 along which seawater discharging from the discharge chamber 49 can be conveyed. The discharge line 135 of this embodiment includes a flexible section 137 for accommodating the angular movement of the pump.

The pumping chamber 100 undergoes expansion and contraction in response to reciprocatory movement of the piston 61. The reciprocatory motion of the piston 61 comprises an upstroke (corresponding to volume contraction of the pumping chamber) and a downstroke (corresponding to volume expansion of the pumping chamber). In this way, the pump performs a pumping stroke upon upward movement of the piston and an intake stroke upon downward movement of the piston.

The piston 61 is linked to the float 12 such that uplift of the float 12 in response to a wave disturbance causes the piston to undergo an upstroke. The piston 61 is adapted to undergo a subsequent downstroke under the influence of gravity; specifically, the weight of the piston 61 and the associated link to the float 12 overcomes any buoyancy effect of the float 12, causing the piston 61 to descend and thereby perform the downstroke.

The piston 61 is linked to the float 12 by a lifting mechanism 140 attached to the lower end of tether 17, the upper end of which is connected to the float 12.

The lifting mechanism 140 comprises a rigid lift rod 141 extending between the float and a lift head 143 accommodated in the cavity 59. The lift rod 141 extends through an opening 142 in the cap structure 46. The opening 142 incorporates a bushing 144. The lift head 143 has a central shank 155 which is connected to the rigid lift rod 141 by way of a connector 147, and a plurality of arms 149 extending outwardly from the central shank 145. The outer end of each arm 149 is attached to the upper end of a connecting rod 151 extending downwardly through the annular space 57 to a base 153 at the lower end of the piston 61. The lower end of each connecting rod 151 is attached to the piston base 153. In this embodiment, there are three arms 149 and consequently three connecting rods 151. The connecting rods 151 are circumferentially spaced about the piston 61 to apply a uniform lifting force to the piston. The connecting rods 151 extend through openings in the two partitions 51, 53. Connector 147 comprises a pivotal connection which can accommodate misalignment between the lift rod 141 and the shank 155 of the lift head 143.

The rigid lift rod 141 is enclosed within a covering 152, the purpose of which is to protect the lift rod from foreign matter (such as scale and marine crustacean) which might otherwise accumulate on it. This avoids the potential for accumulated foreign matter entering the pump to foul its workings. The covering 152 comprises an extensible cover 154 extending from the cap structure 46 to the end of the rigid lift rod 141 or at least to a section of the rigid lift rod which does not enter the interior of the cap structure 46 on the downstroke of the piston 61. The extensible cover 154 sealingly engages the lift rod 141 at end location 157.

The extensible cover 154 comprises a rubber sheath 159 in this embodiment. The rubber sheath 159 is configured to operate both in extension and compression with respect to its neutral point. When in extension, the sheath 159 stretches to accommodate the outward extent of movement of the lift rod 141. When in compression, the sheath 159 progressively collapses, assuming bellows-like corrugations. Contact between the sheath 159 and the pump lift rod 141 is controlled and restricted to particular sections 161 of the sheath 159. Each section 161 is defined by a ring 163 that is bonded onto or formed integrally the sheath wall 165. The rings 163 are formed of a material resistant to wear as a result of continual rubbing contact with the pump lift rod 141 and does not cause any abrasion of the surface of the lift rod. The rings 163 may be formed of any suitable material. A suitable material is likely to be a natural elastomer.

The piston 61 has a foot 171 provided on its lower end, and there is a corresponding shoe 173 provided on the innerside of the lower wall 43 of the intake chamber 47.

The foot 171 has an internal passage 175 which is open at the bottom end to allow entry of water into the piston chamber 102.

The shoe 173 is configured as a sleeve 176 having an open top 177 through which the foot 171 of the piston 61 can be received as the piston approaches the end of its descent. With this arrangement, the foot 171 and the sleeve 173 co-operate to provide a hydraulic dampener. Specifically, water contained within the shoe 173 is displaced as the piston 61 descends and the foot 171 enters the shoe 173. The displacement of the water is controlled in any appropriate way, such as by appropriate clearances between the foot 171 and the shoe 173, or discharge ports within the shoe. The controlled displacement of the water provides the dampening effect as the piston approaches the bottom of its down stroke.

The float 12 has an underside 181 incorporating a cavity 183 which opens onto the underside. The cavity 183 is bounded by a cavity wall 185 extending upwardly and inwardly towards an anchor point 187 to which the lift rod 141 is connected.

The upper end section of the pump body 31 is provided with a buoyancy float 191 comprising a bladder structure 193 defining an interior 195 containing air. The bladder structure 193 is so configured as to provide a righting moment to the pump 13 (in much the same way as the hull of a boat is configured to provide a righting moment). In this embodiment, the bladder structure 193 is of ellipsoidal configuration.

In operation, a wave impinging on the apparatus 10 causes uplift of the float 12. The uplift of the float 12 is transmitted through the coupling 15 to the pump 13, causing the piston 61 to lift, with the result that the pumping chamber 100 undergoes volume contraction. In this way, the pump 13 performs a pumping stroke, with some of the water confined within the pumping chamber 100 being discharged through the outlet 131 and along the discharge line 135. Once the wave has passed, the uplift force applied to the float 12 diminishes and the float descends under the weight of the various components connected thereto, including the coupling 15, the lifting mechanism 141 and the piston 61. As the piston 61 descends, it plunges into water which has entered the intake chamber 47. As the piston 61 descends, water within intake chamber 47 flows into the piston chamber 102 and the progressively expanding pumping chamber 100. The inlet check valve 105 allows entry of the water. This charges the piston chamber 102 and the discharge chamber 49 in readiness for the next pumping stroke which is performed upon uplift of the float 12 in response to the next wave disturbance.

Figure 9:
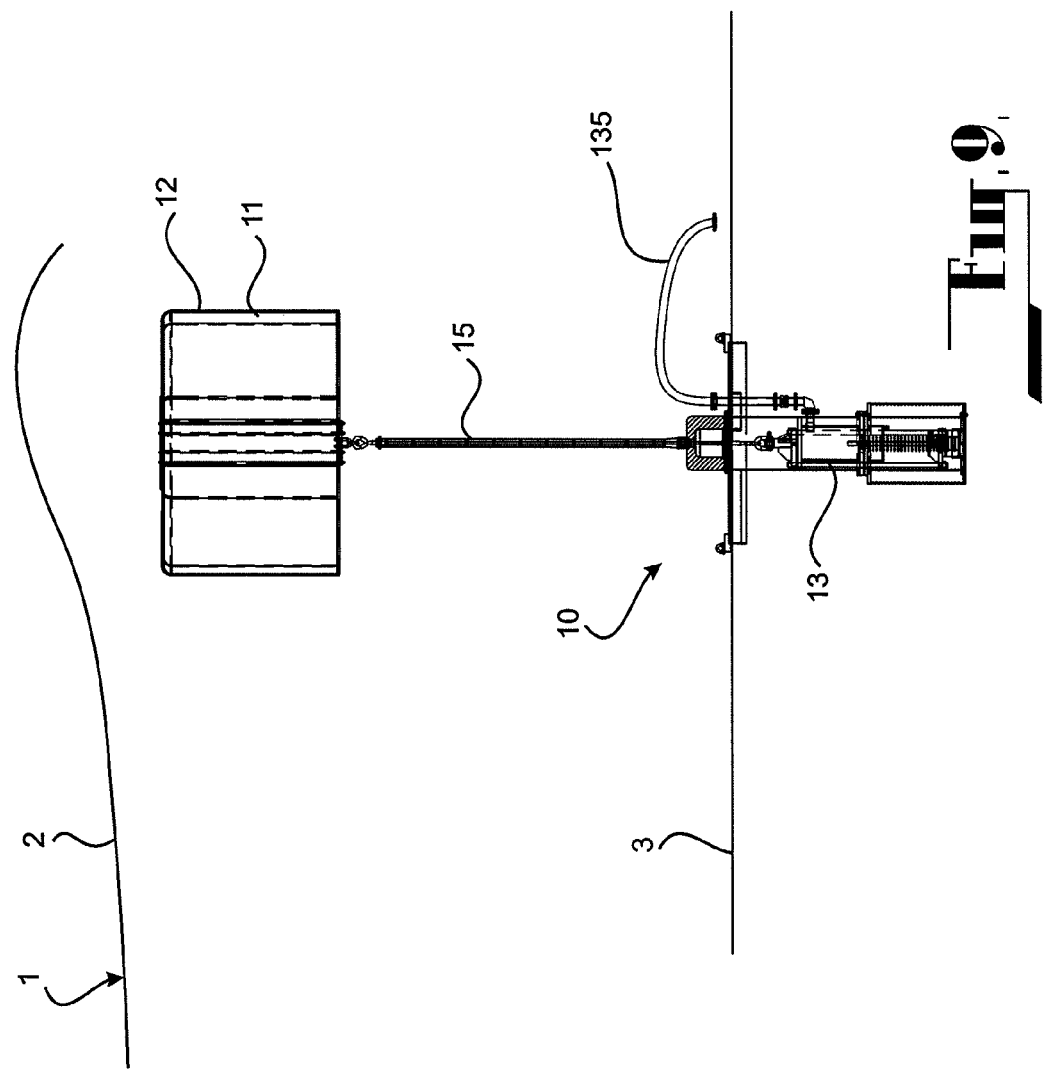
FIG. 9 is a schematic view of apparatus according to a second embodiment installed in position under water.
Figure 10:
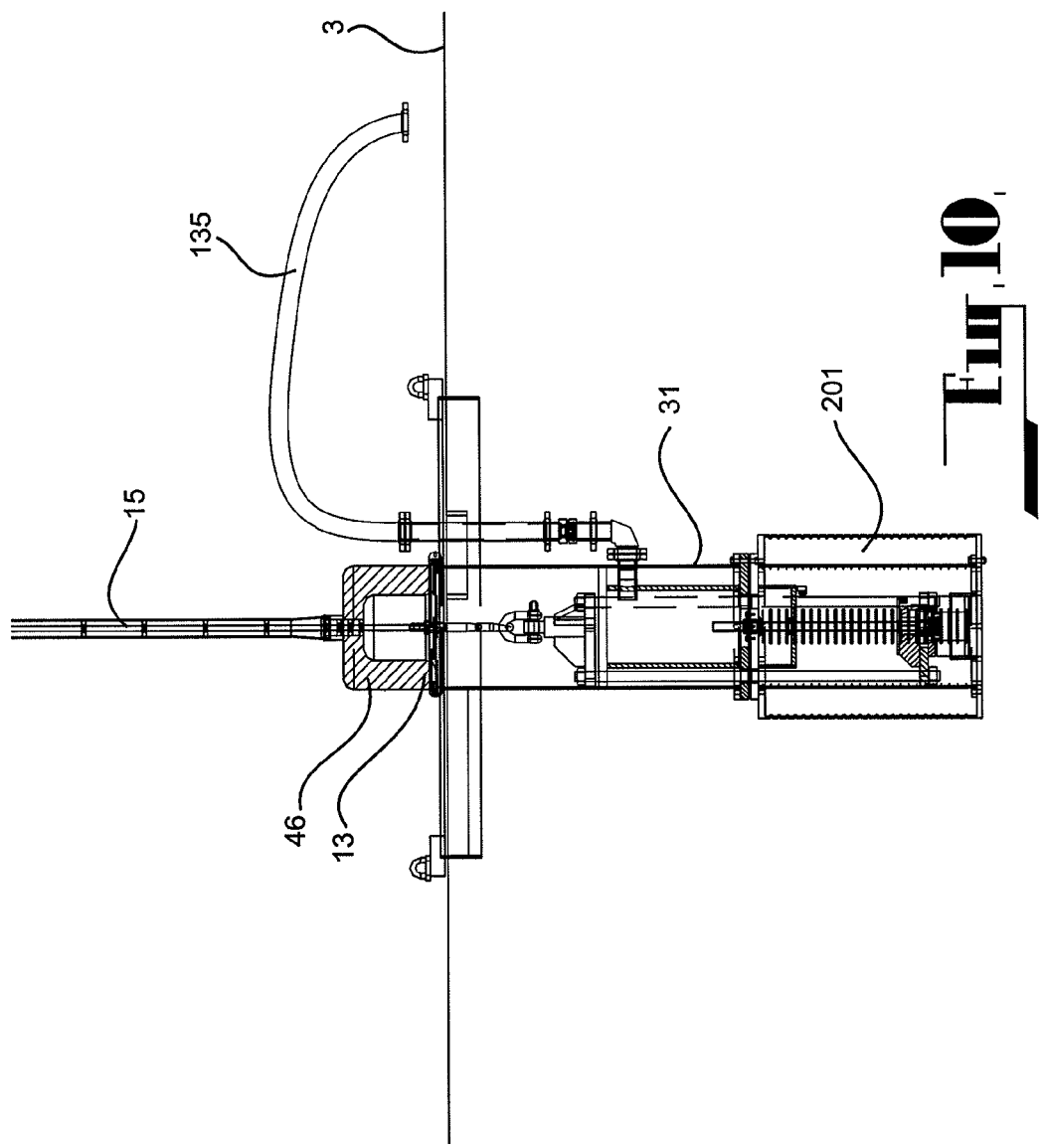
FIG. 10 is a fragmentary view of the pump forming part of the apparatus of FIG. 9.
Figure 11:
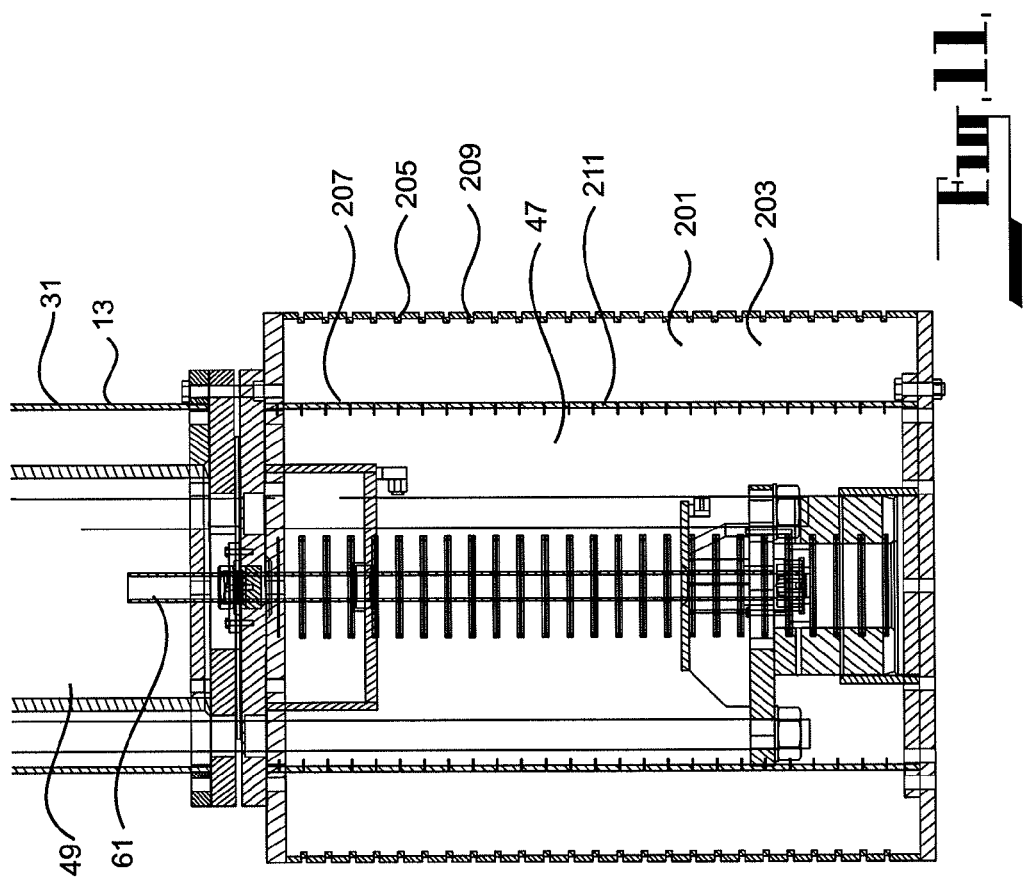
FIG. 11 is a fragmentary view on an enlarged scale illustrating the lower end section of the pump, including a filtration system associated therewith.

Referring now to FIGS. 9, 10 and 11, there is shown apparatus according to a second embodiment. The apparatus according to the second embodiment is similar in many respects to the first embodiment, the exception being the manner by which the pump 13 is anchored to the seabed 3. In this embodiment, the pump body 31, which is configured as a column, is adapted to be sunk into the seabed 3 so that the lower end portion is embedded in the seabed. Indeed, the pump body 31 can be embedded to an extent that only a small portion at its upper end is exposed and in contact with seawater. With this arrangement, the body of the pump is fixed with respect to the seabed 3 and there is no provision for the angular movement that existed with the first embodiment. Accordingly, the inlet and discharge lines 123, 135 do not require the flexible sections.

The sand of the seabed 3 in which the body 31 is embedded offers a large resistance to lateral movement, thereby resisting, rotation of the body 31. The pump body 31 may, however, flex laterally to a limited extent.

By embedding the body 31 in the seabed 3, it is possible to utilise the surrounding sand from the seabed as a preliminary filtration medium for seawater entering the intake chamber 47. A filter 201 is provided around the intake chamber 47. The filter 201 comprises a filtering medium, such as gravel and coarse sand, accommodated in an annular filter chamber 203. The annular filter chamber 203 comprises an outer wall 205 and an inner wall 207 which can be defined by a section of the exterior wall of the body 31. The outer wall has perforations 209 such as slots, and the inner wall 207 also has perforations 211 such as slots. The number and size of the perforations 209, 211 are so selected as to maintain a continuous reservoir of seawater within the intake chamber 47 so that the pump is always primed. The perforations 209, 211 are also of a size to contain the filtering medium within the filter chamber 203. The perforations 211 in the inner wall are smaller than the perforations 209 to provide further filtration to the seawater entering the intake chamber 47. Once the pump 13 has been emplaced in the seabed 3, hydrostatic pressure of the water above will feed seawater through the perforations and saturate the filtering medium.

Figure 12:
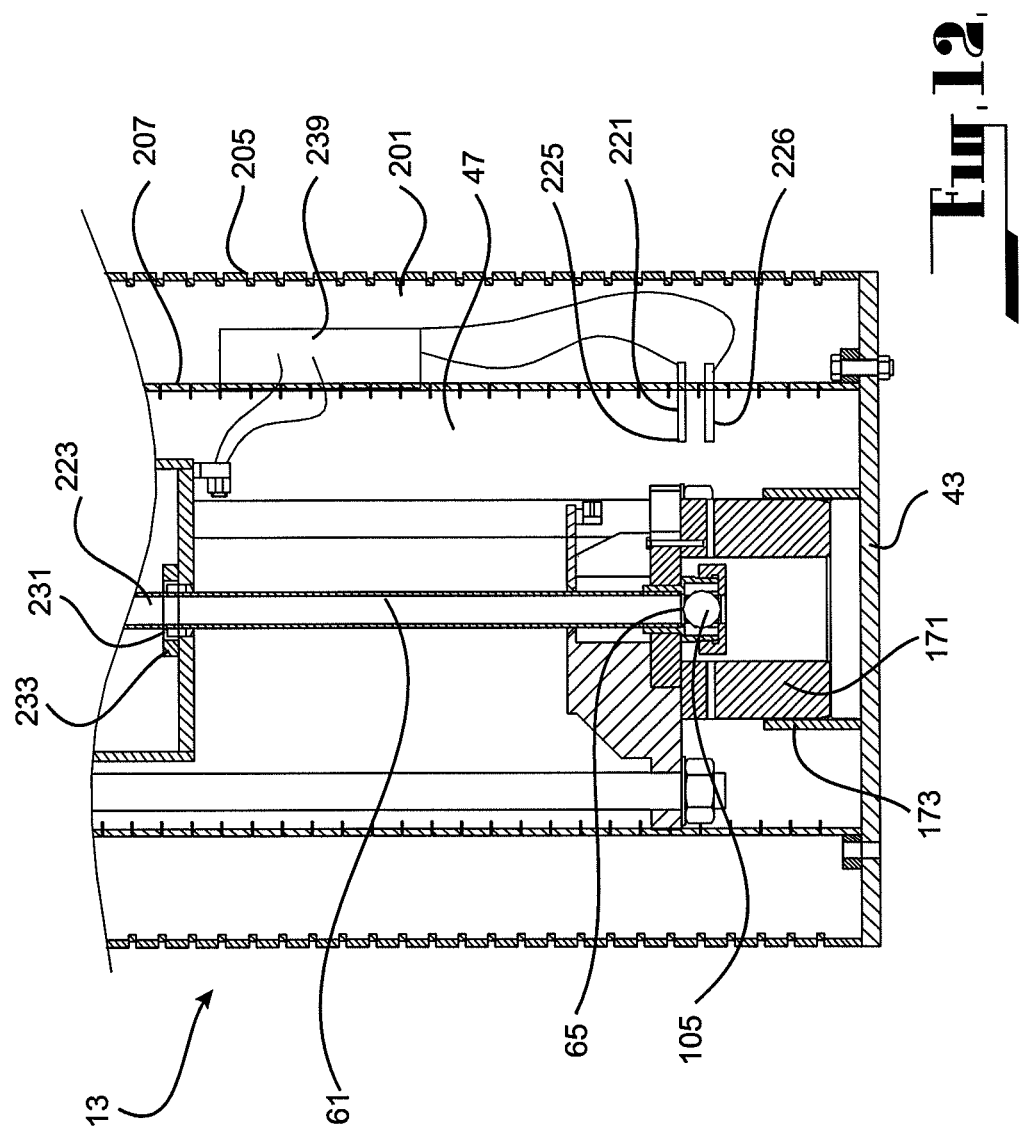
FIG. 12 is a schematic fragmentary view of a lower portion of a pump for an apparatus accordingly to a third embodiment, with the piston shown at the end of its downstroke.
Figure 13:
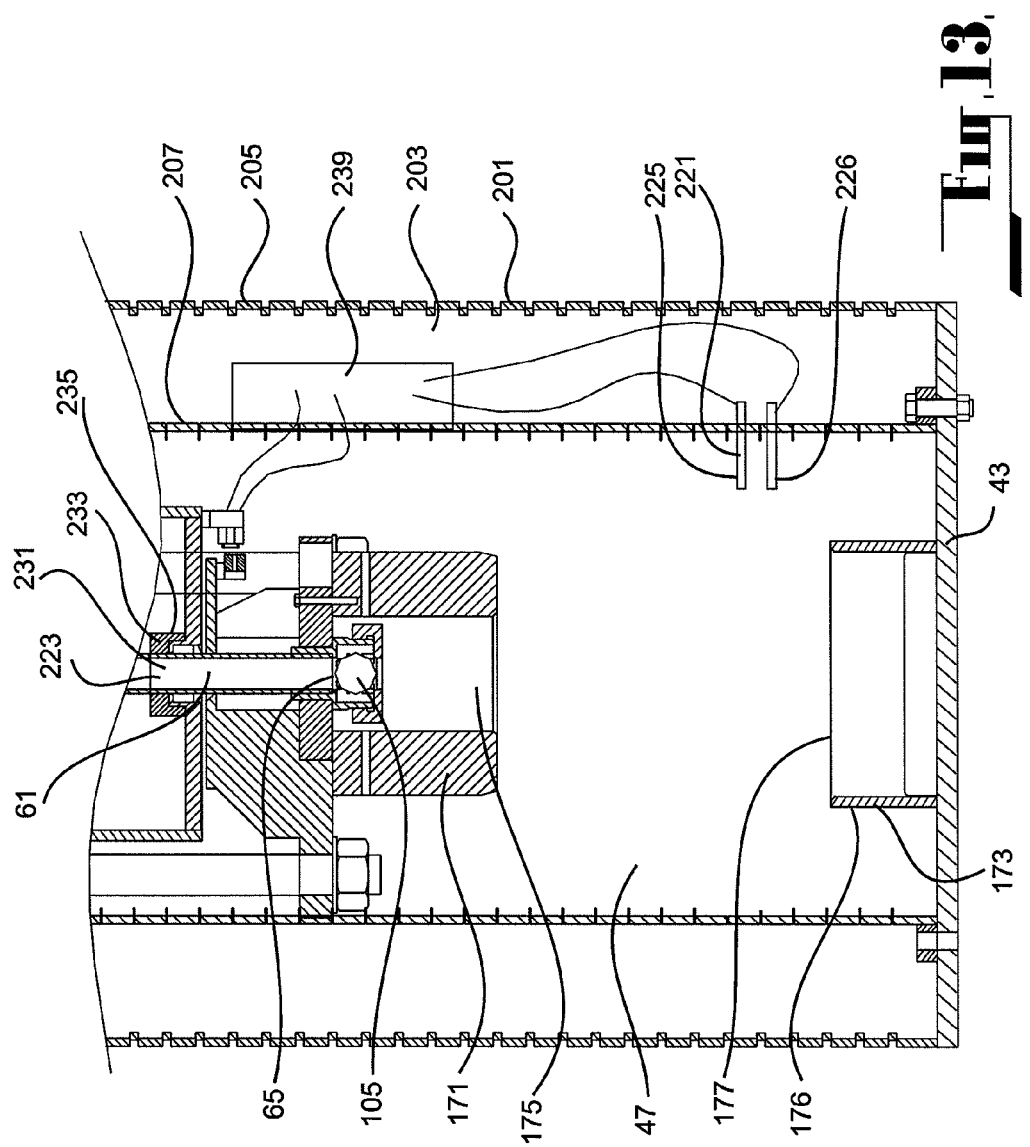
FIG. 13 is view somewhat similar to FIG. 12 but on an enlarged scale and also showing the piston at the end of its upstroke.
Figure 14:
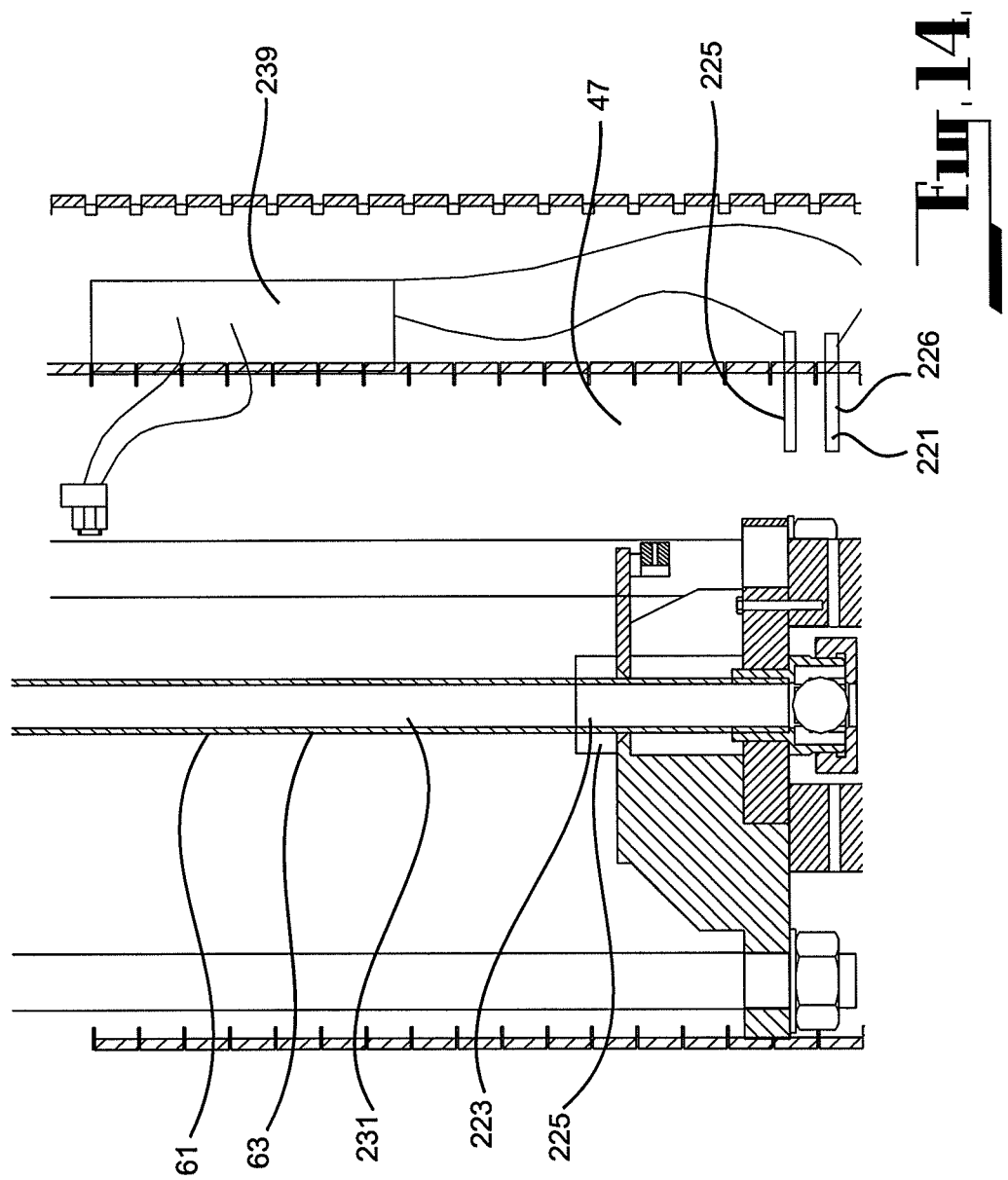
FIG. 14 is a detailed view of FIG. 12 illustrating in particular an electrolytic cell and a linear electric generator for producing electric current for the electrolytic cell.
Figure 15:
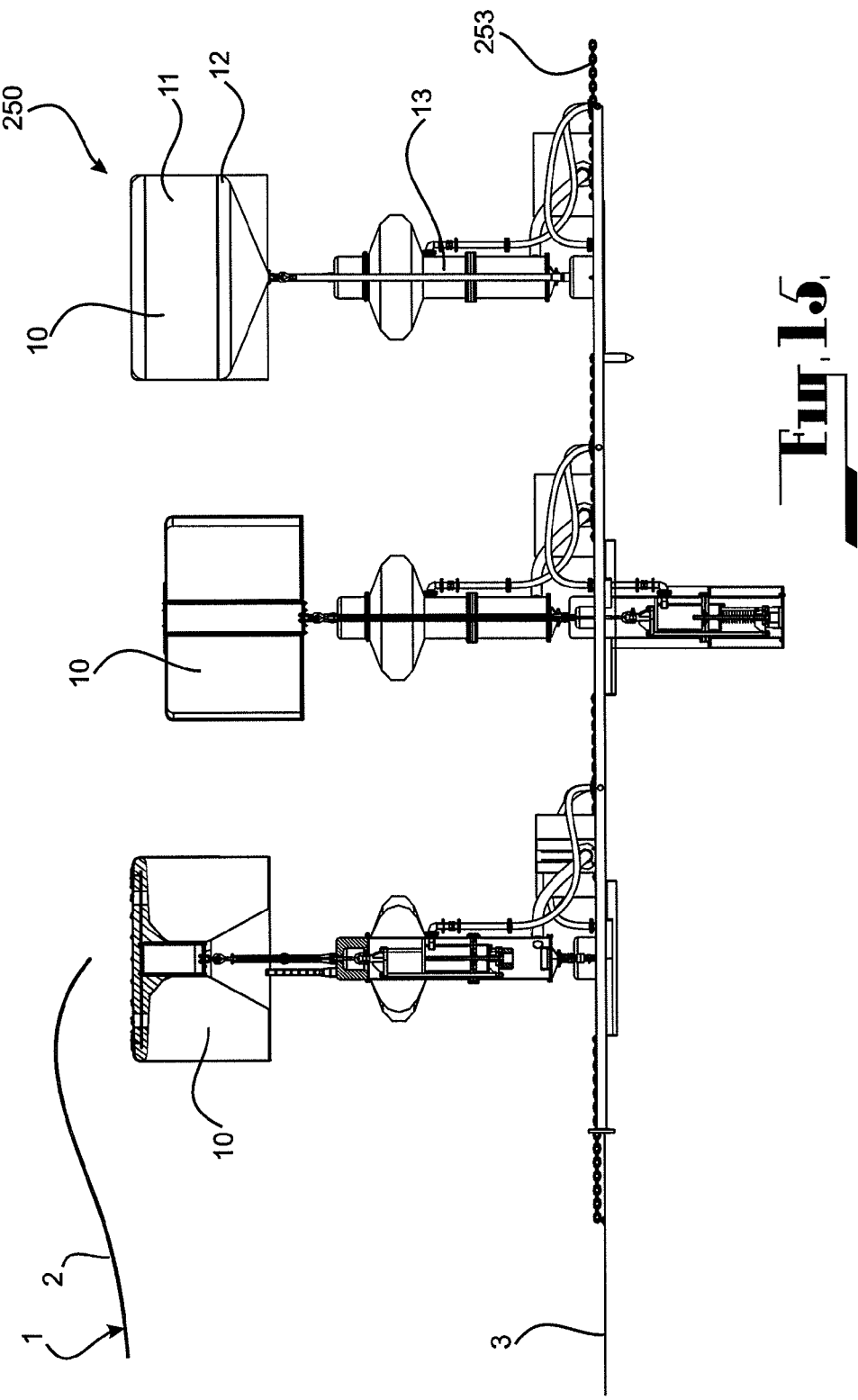
FIG. 15 is a schematic view of a plurality of pumps assembled in an array.
Figure 16:
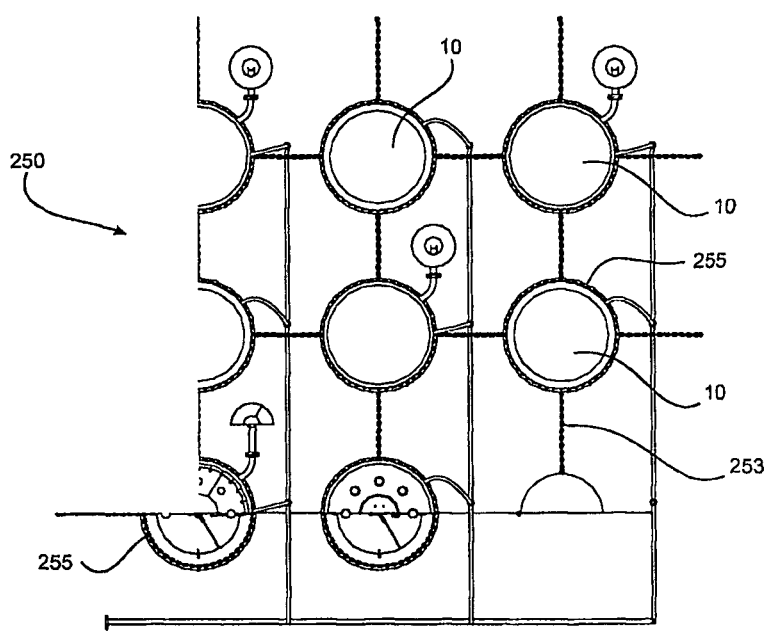
FIG. 16 is a plan view of the array.
Figure 17:
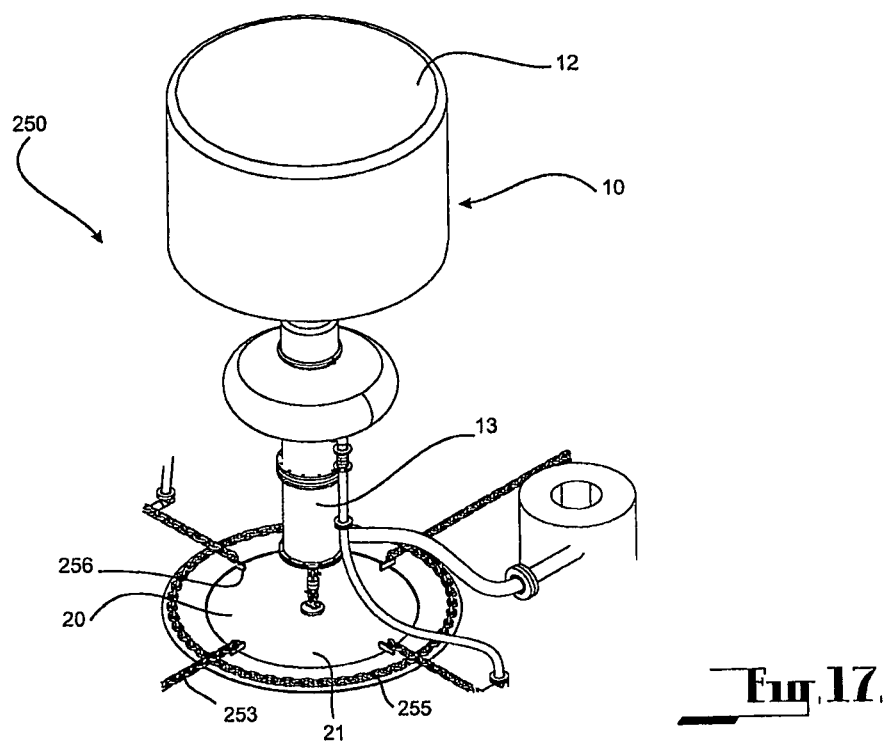
FIG. 17 is a perspective view of one of the pumps in the array.
Figure 18:
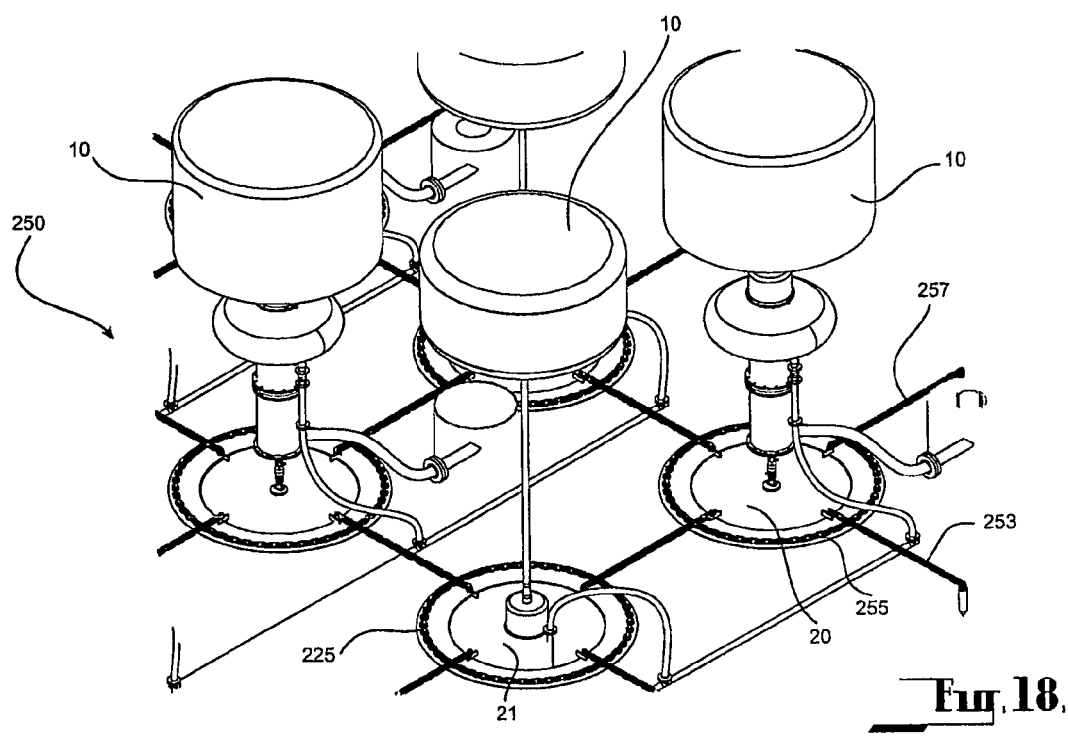
FIG. 18 is a perspective view of several of the pumps in the array.
Figure 19:
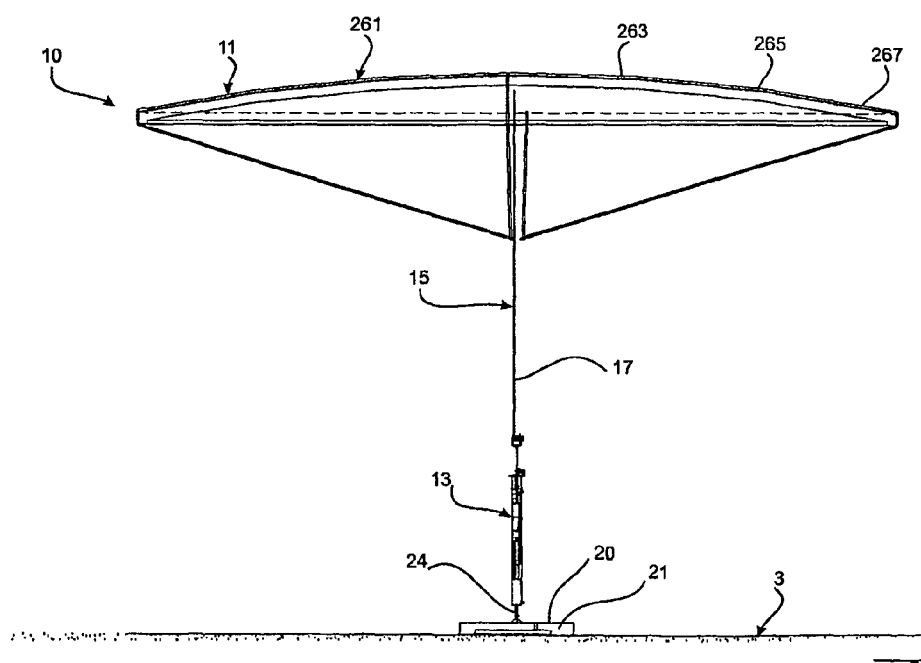
FIG. 19 is a schematic view of apparatus according to a further embodiment.

Referring now to FIGS. 12, 13 and 14, there is apparatus according to a third embodiment. The apparatus according to the third embodiment is similar in many respects to the second embodiment and so corresponding reference numerals are used to identify corresponding parts. The pump 13 in this third embodiment is essentially the same as the pump of the second embodiment but with an additional feature which provides chlorination of the water delivered by the pump. The chlorination can be for the purpose of controlling zooplankton growth within the pumping system (including within any piping and structures to which the chlorinated seawater is delivered).

Specifically, the pump 13 is provided with an electrolytic cell 221 to which current is supplied from a linear electric generator 223 operable in response to reciprocation of the pump. The electrolytic cell 221 is contacted by seawater in the pump 13 and the resultant electrolytic action results in the production of chlorine.

The electrolytic cell 221 comprises two electrodes 225, 226 appropriately spaced, preferably less than 10 mm apart. In this embodiment, the electrodes are mounted in the intake chamber 47.

The linear electric generator 223 comprises an armature 231 defined by the piston tube 63, and a stator 233 defined by windings 235 around the armature. The piston tube 63 may be formed from appropriate magnetic material or may carry magnetic elements. With this arrangement, reciprocation of the piston tube 63 corresponds to linear movement of the armature 231 relative to the stator 233, thereby generating an electrical current.

The stator 233 may be mounted at any appropriate location, such as in the discharge chamber 49 or in the leakage chamber 93.

The linear electric generator 223 generates a DC current and so the polarity of the electrodes 225, 226 reverses with each stroke of the armature. In this way, the electrodes 225, 226 switch between roles of anode and cathode on each cycle. This is beneficial in that erosion of the anode occurring through oxidation is distributed between the two electrodes.

Current produced by the linear electric generator 223 is regulated. A simple solid state regulator device 239 provides such regulation in this embodiment. The regulation provides for selective control of the amount of chlorination.

While the feature of chlorination has been described in relation to the pump of the second embodiment, it can of course be applied to the pump of the first embodiment. The feature of chlorination could also be applied to any other reciprocating pump.

Apparatus according to the previous embodiments can operate in conjunction with other similar such apparatus, with the outlet of each pump being connected to a common manifold. Such an arrangement is shown in FIGS. 15 to 18 where several apparatus 10 are positioned in an array 250 and connected to a common manifold which carries high-pressure seawater (delivered by the pumps) to shore.

In the arrangement shown, the array 250 comprises a square grid but of course other grid patterns are possible. The spacing between units 10 in the array can depend on factors such as wavelength of the dominant sea swell and the configuration of the floats 12. It is also most desirable that the spacing be such that it allows unimpeded passage of the largest sea creatures to inhabit the ocean area where the units are deployed.

Each unit 10 in the array is attached to the units 10 adjacent thereto by chains 253. The chains 253 form closed loops 255, one attached to the base of each pump 13. The chains 253 are attached to the bases 21 at four connection points 256. This arrangement provides a strong matting structure 257 interconnecting the various units 10 in the array.

In the embodiments described previously, the means 11 responsive to water disturbances comprised floats 12. Other arrangements are of course possible. Referring to the embodiment shown in FIGS. 19 to 22, the means 11 comprise a canopy 261. The canopy 261 comprises a body 263 having a skin 265 presenting a upper face 267 exposed to the body of seawater 1 and directed to the water surface 2, and a lower face 269 also exposed to the body of seawater 1 but directed away from the water surface 2.

The body 263 comprises a frame structure 271 and a covering 273 which provides a skin on the frame structure. The covering 273 comprises a membrane which is pliant and which is also impervious to water.

The frame structure 271 comprises a peripheral frame 275 in the form of a ring and frame elements 277 extending crosswise with respect to the ring. The frame elements 277 are acuate so as to cause the covering to assume a contoured profile, with the upper face 267 being convex and the lower face 269 being concave.

The frame structure 271 also includes a plurality of struts 281 extending downwardly and inwardly from the peripheral frame 275 for connection to the flexible cable 15.

The frame structure 271 is of a diameter such that its lateral extent in the direction of wave travel is up to about ¼ of the typical wave length encountered in the body of water.

Figure 20:
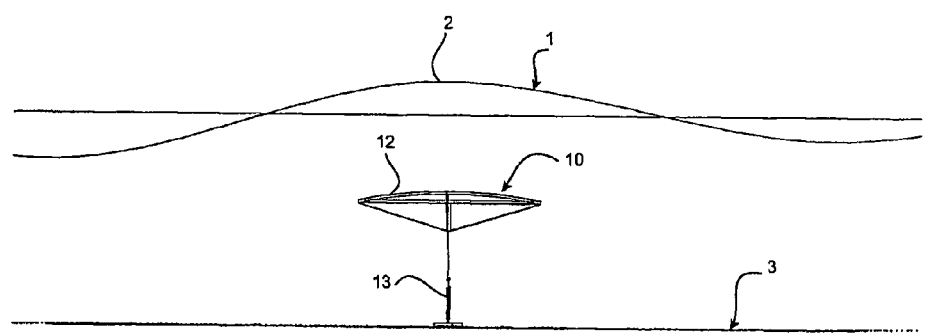
FIG. 20 is a schematic view of the apparatus of FIG. 19 installed in position under water.

The apparatus 10 is installed in the body of water 1, preferably at a location where the water depth is in the range of about 10 m to 100 m, and more preferably within the range of about 20 m to 50 m. Further, the apparatus 10 is installed so that the overall height h of the apparatus is less than the mean water depth H, as illustrated in FIG. 20 of the drawings.

The depth of submersion of the device (H−h) is set such that the peak-to-trough wave height is always less than or equal to this value so that the canopy 261 always remains submerged or at the water surface. The extent of upward and downward movement of the canopy 261 is constrained by the maximum stroke length of the pump 13.

Referring now to FIGS. 23 to 26, there is shown apparatus according to a further embodiment, comprising an array of interconnected canopies 261, comprising a leading canopy 261a and a plurality of other canopies 261b extending downstream in a line away from each leading canopy 261a in a direction corresponding to the wave direction. Each canopy 261a, 261b is operatively connected to a respective pump.

In this embodiment, the canopies 261 are generally rectangular in plan, rather than circular. The canopies are connected one to another by flexible connectors 291 such as high tensile cables possessing minimal extension. The interconnections provided by the connectors 291 are short compared to the extent of the canopies 261 so that the arrangement of canopies responds to the wave profile and tends to mimic it. The canopies closer to an approaching wave experience the largest energy flux from the passing wave. The leading canopy 261 incorporates flotation 293 and is anchored to the seabed by way of an anchoring cable 295.

In this embodiment, a wave impinging on the apparatus has a substantially laminar energy flow which splits into upper and lower fluxes upon impingement on the leading edge of the leading canopy 261a, as was the case with the earlier embodiments. The upper and lower energy fluxes propagate with different velocities, the upper flux passing over the canopies 261 while the lower one deposits energy successively down the line of canopies via uplift as it traverses them. On reaching the end of the line of canopies, the two wave fluxes recombine. The recombination may generate undesirable turbulence which can be minimised by adjusting the overall length of the line of canopies, as well as providing venting between the canopies 261.

The operational sequence of the wave capture is illustrated in FIGS. 24, 25 and 26, with the representation of the upper flux being identified by reference numeral 301 and the representation of the lower flux being identified by reference numeral 302. The propagation of the lower energy flux 302 along the line of canopies 261 causes sequential uplift of the canopies and operation of their associated pumps 13. The direction of the uplift force is depicted by the arrow identified by reference numeral 305.

FIG. 26 illustrates the operation of a larger amplitude incident wave that has the capacity to create uplift on multiple canopies 12c and thereby activate several pumps 13c simultaneously.

Figure 27:
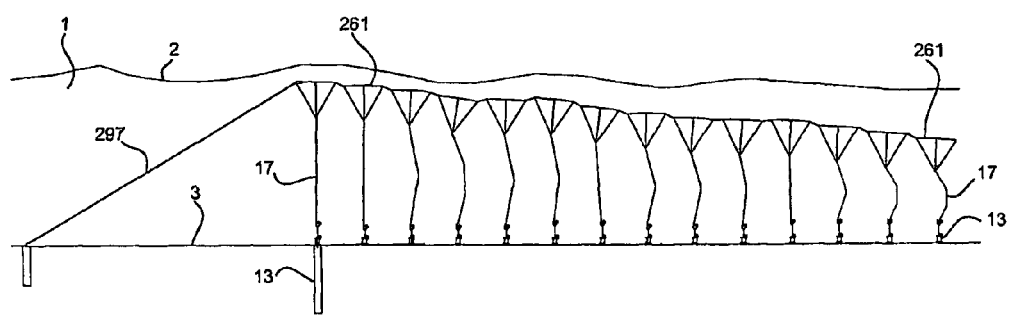
FIG. 27 is a schematic elevational view of apparatus according to a still further embodiment.

Referring now to FIG. 27, there is shown apparatus according to yet another embodiment. This embodiment is similar to the previous embodiment, with the exception that the tethers 17 attaching the canopies 261 to their respective pumps 13 are progressively shorter in the direction away from the leading edge, providing a downward slope confronting the wave direction. This is advantageous in that it offers the capability of capturing tidal (i.e. streamed flow) energy as well as surface wave energy by virtue of the fact that the downward sloping line of canopies 261 presents a substantially enhanced cross-section to horizontal currents.

Figure 28:
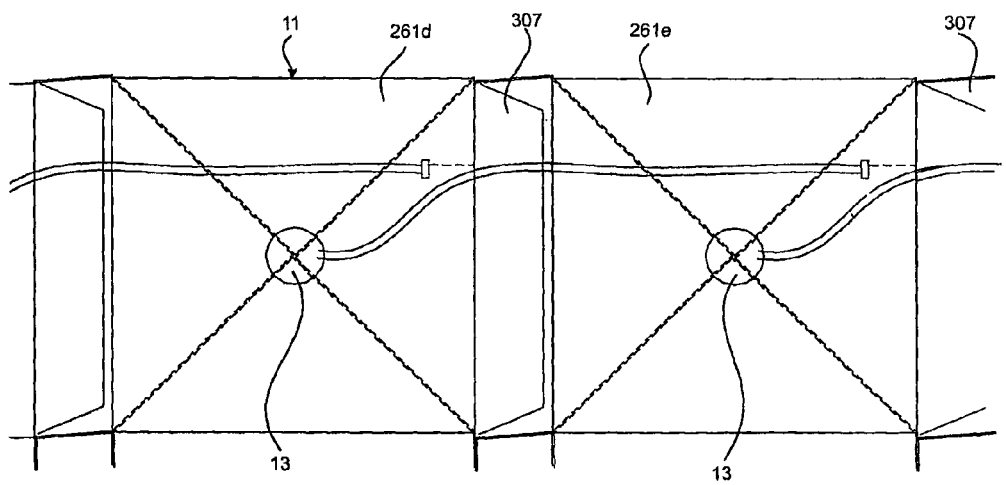
FIG. 28 is a fragmentary plan view of apparatus according to a still further embodiment.

Referring now to FIG. 28, there is illustrated an apparatus involving an array of canopies extending in the direction of wave travel. The canopies 261 are linked one to another (as was the case in previous embodiments), involving a canopy array, but there is also provided a flap 307 extending between neighbouring canopies. The flap 307 is attached to one canopy 261d and extends to the canopy 261e on the downstream side thereof with respect to the direction of wave travel. The flap 307 comprises any appropriate material (such as rubber sheet) that is compliant yet sufficiently heavy to remain in contact with the adjacent canopy 261e with some overlap. The flaps 307 operate in much the same manner as flaps on an aeroplane; that is, they may be open to allow passage of fluid to bypass an aerofoil and reduce lift. In this embodiment, the flaps operate automatically when the pressure on the canopy exceeds a designed limit such as might occur during large wave conditions in a storm. The flaps 307 peel open gradually if they are made of a material such as rubber sheeting and they can provide important limiting of the forces on the structure during storm conditions.

Figure 29:
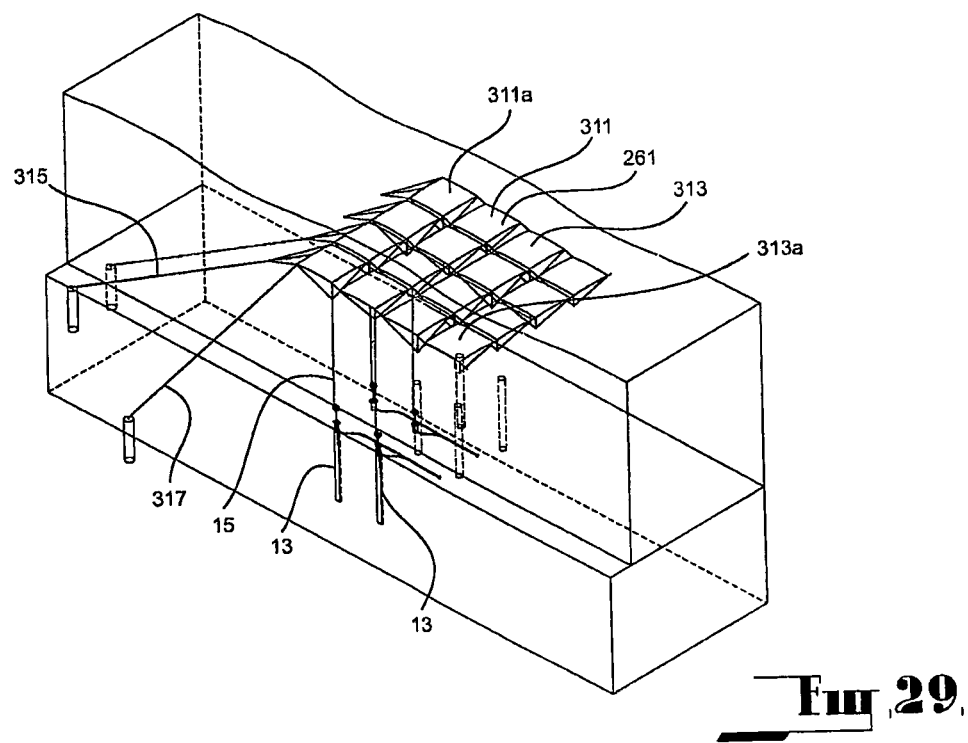
FIG. 29 is a schematic perspective view of apparatus according to a still further embodiment.
Figure 30:
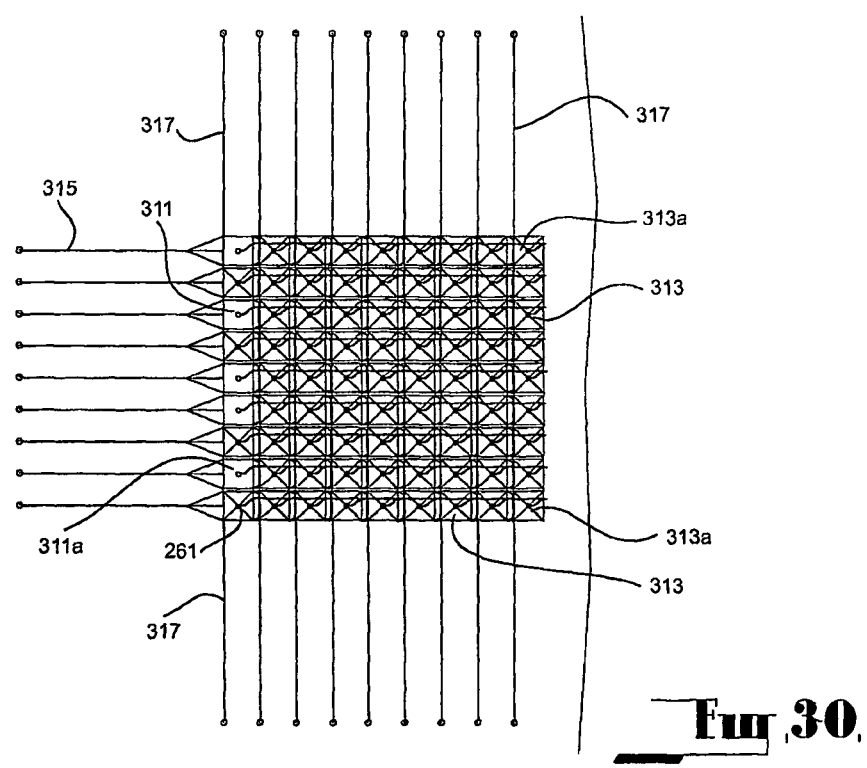
FIG. 30 is a schematic plan view of the apparatus of FIG. 29.

Referring now to FIGS. 29 and 30, there is illustrated an apparatus involving an array of interconnected canopies 261, in which the canopies are arranged in rows 311 extending cross-wise with respect to the direction of wave travel and also in lines 313 extending in the direction of wave travel.

The canopies 261 in the leading row 311a are tethered by anchoring cables 315 and canopies in the outer lines 313a are tethered by lateral anchoring cables 317.

Figure 31:
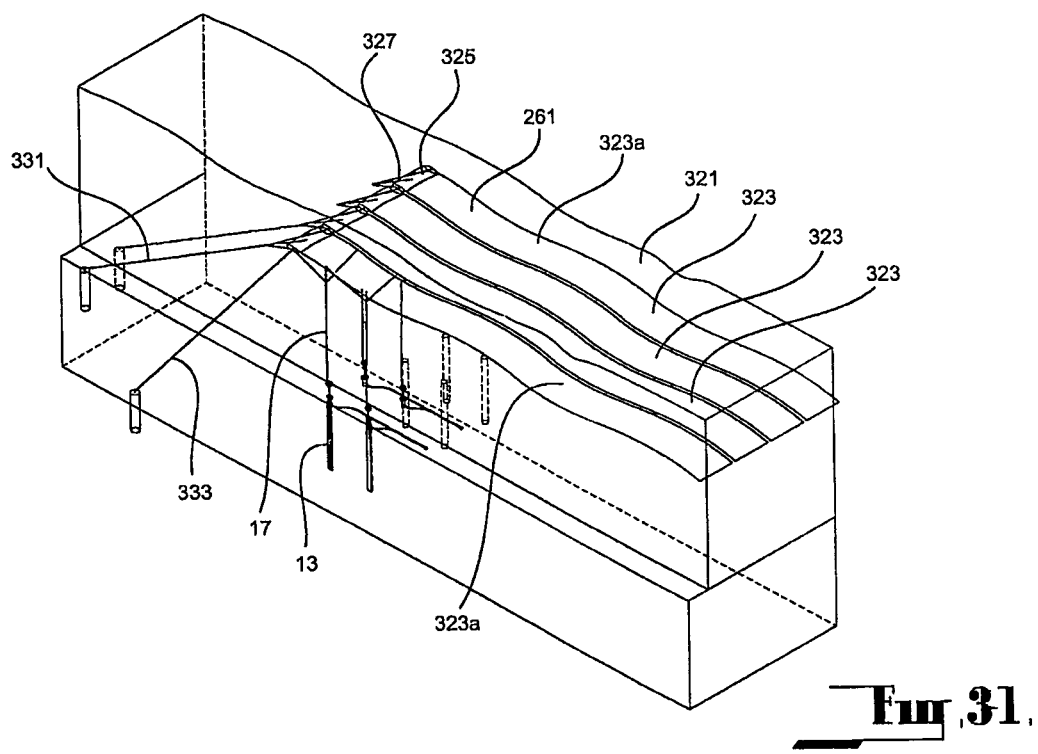
FIG. 31 is a schematic perspective view of apparatus according to a still further embodiment.
Figure 32:
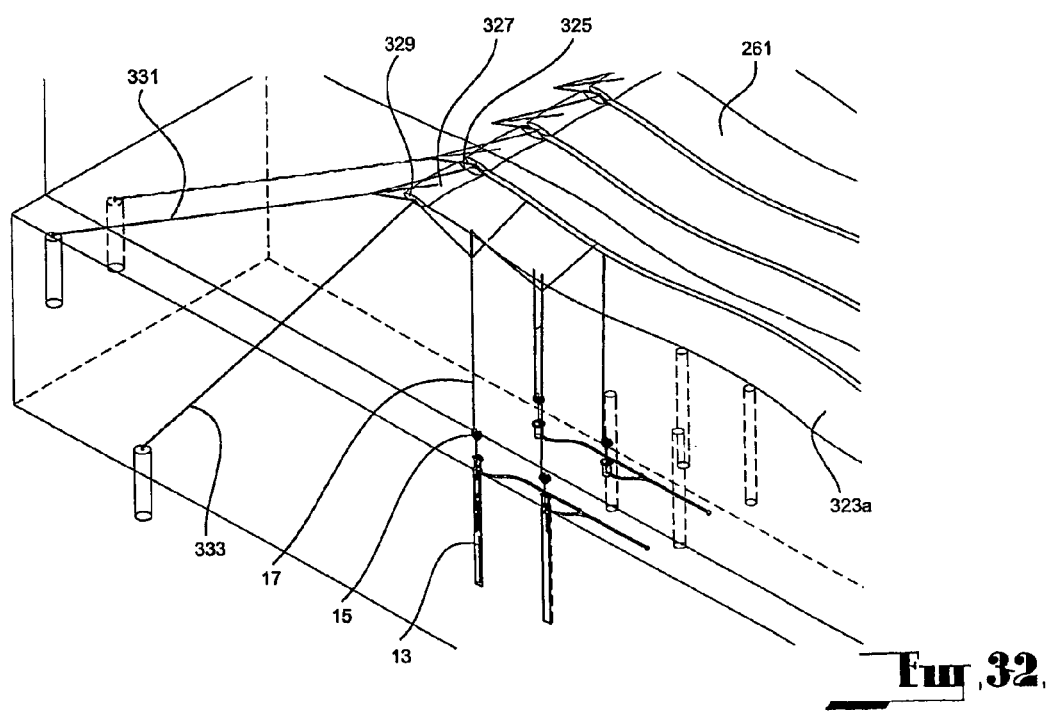
FIG. 32 is a fragmentary perspective view of the leading edge section of the apparatus of FIG. 31.
Figure 33:
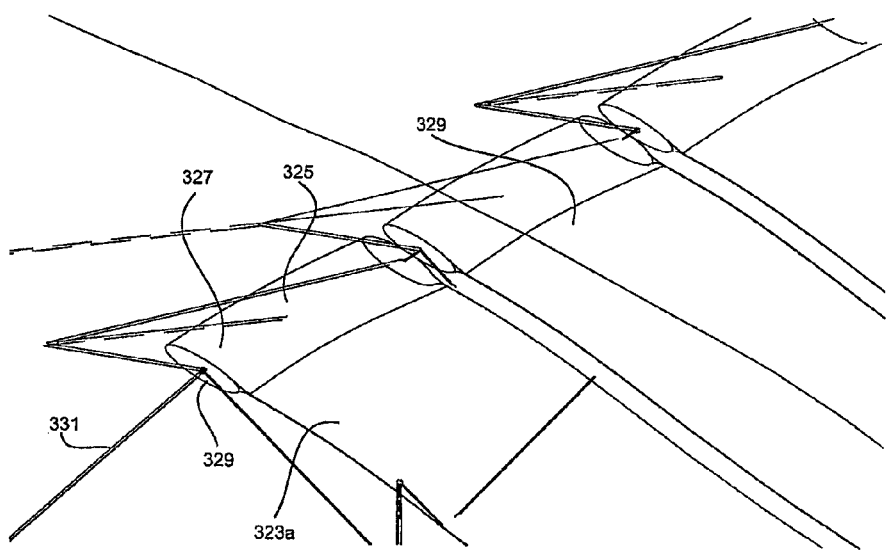
FIG. 33 is a further fragmentary perspective view of the leading edge section of the apparatus of FIG. 31.

In several of the previous embodiments, canopies 261 were interconnected in an array. Rather than having discreet canopies connected one to another to form an array, it is possible for there to be a common canopy extending in the direction of wave travel and coupled to a series of pumps positioned at intervals in the direction of the wave travel. One such arrangement is illustrated in FIGS. 31, 32 and 33, where the common canopy 261 comprises a body 321 configured as a plurality of strips 323 each of flexible yet inextensible material which responds to the wave shape. Each strip 323 extends in the direction of wave travel, and the strips are positioned one alongside the other in a direction transverse to wave travel. The leading edge 325 of each strip 323 incorporates buoyancy 327 to assist in maintaining the attitude of the leading edge. The buoyancy 327 may be provided by a buoyant pocket 329 which may, for example, incorporate buoyant material. Buoyancy may also be provided at intervals along the length of each strip 323 to provide the overall strip with the necessary buoyancy. The canopy 261 is tethered, each strip 323 being anchored at its leading edge to the seabed 3 by one or more anchoring cables 331. The canopy 261 is also tethered laterally by anchoring cables 333 attached to the leading edges of the outer strips 323a. The pumps 13 are operably connected to the respective strips 203 by a network of cables 17 as necessary. Flaps may be incorporated in the strips 323 in order to provide relief in storm conditions, as was the case in an earlier embodiment.

From the foregoing, it is evident that the present embodiments each provide a simple yet highly-effective apparatus for harnessing ocean wave energy and converting the harnessed energy to high-pressure seawater.

Modifications and improvements can be made without departing from the scope of the invention.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. Apparatus for capturing wave energy in a body of water having a water surface, the apparatus comprising:
   an object configured to respond to wave disturbances in the body of water,
   a reciprocating pump within the body of water, the reciprocating pump comprising:
      a body defining an intake chamber and a discharge chamber,
      a piston slidably and sealingly mounted with respect to the body for reciprocal movement with respect to the intake chamber and the discharge chamber, the piston extending between the intake chamber and the discharge chamber, the piston being mounted for reciprocation to co-operate with the discharge chamber and to define a pumping chamber, the volume of the pumping chamber varying upon reciprocating motion of the piston, the intake chamber and the discharge chamber being separated by a partition, the piston passing through the partition and being in sliding and sealing engagement with the partition,
      a flow passage within the piston, the flow passage having an inlet for receiving water from the body of water, and an outlet for discharging the received water into the discharge chamber, whereby water is drawn into the pumping chamber upon volume expansion thereof and is discharged from the pumping chamber upon volume reduction thereof,
   the reciprocating pump being operably coupled to the object to be driven by upward movement of the object to undergo a first stroke.

2. Apparatus according to claim 1, wherein the reciprocating pump is adapted to undergo a second return stroke under the influence of gravity.

3. Apparatus according to claim 2, wherein the first stroke comprises a pumping stroke and the second return stroke comprises an intake stroke.

4. Apparatus according to claim 3, wherein the reciprocating pump is adapted to receive water from the body of water during the intake stroke thereof and to deliver the received water under pressure during the pumping stroke thereof.

5. Apparatus according to claim 4, wherein the body defines the intake chamber below the piston, and the piston plunges into the intake chamber upon volume expansion of the pumping chamber, the intake chamber being adapted to receive water from a source communicating with the intake chamber.

6. Apparatus according to claim 5, wherein the intake chamber communicates with the water source by way of a water delivery line.

7. Apparatus according to claim 5 wherein the intake chamber has a wall pervious to water to receive water therethrough.

8. Apparatus according to claim 7, wherein the wall incorporates perforations such as slots.

9. Apparatus according to claim 8 wherein the wall separates the intake chamber from a filtering medium providing filtration to water entering the intake chamber.

10. Apparatus according to claim 1, wherein the pump is anchored to the floor of the body of water.

11. Apparatus according to claim 10, wherein the pump is anchored rigidly to the floor.

12. Apparatus according to claim 10, wherein the pump is anchored for angular movement relative to the floor.

13. Apparatus according to claim 1, wherein the pump is embedded in the sea floor.

14. Apparatus according to claim 1, wherein a seal structure is provided between the piston and the partition to provide the sliding and sealing engagement therebetween.

15. Apparatus according to claim 14, wherein the seal structure comprises a first seal in sliding and sealing engagement with the piston and a second seal in sliding and sealing engagement with the piston, and a fluid cavity between the two seals for receiving any fluid leakage.

16. Apparatus according to claim 1, wherein the piston comprises a piston chamber having an end opening onto the intake chamber and an end opening onto the discharge chamber, and valve means associated with the piston permitting entry of water into the piston chamber from the intake chamber during an intake stroke of the piston while restricting return flow of the fluid into the intake chamber during the pumping stroke of the piston.

17. Apparatus according to claim 16, wherein the valve means comprises a check valve associated with the chamber.

18. Apparatus according to claim 1, wherein the piston is linked to the object by a lifting mechanism.

19. Apparatus according to claim 18, wherein the body also defines a cavity, and the lifting mechanism comprises a rigid lift rod extending between the object and a lift head accommodated in the cavity, the lift head being operatively coupled to the piston.

20. Apparatus according to claim 19, wherein a covering is provided about that portion of the rigid lift rod which extends into and retracts from the pump body during reciprocation of the piston.

21. Apparatus according to claim 20, wherein the covering comprises an extensible sheath extending between the pump body and a portion of the lift rod.

22. Apparatus according to claim 1, further comprising dampening means for movement of the piston towards the end of its intake stroke.

23. Apparatus according to claim 22 wherein the dampening means comprises a foot on the piston and a shoe on the pump body, the foot being receivable in the shoe as the piston approaches the end of its intake to displace water contained in the shoe.

24. Apparatus according to claim 1, wherein the object is submerged in the body of water.

25. Apparatus according to claim 1, wherein the object is located within the body of water and presents a first face exposed to the body of water and directed towards the water surface, and a second face exposed to the body of water and directed away from the water surface.

26. Apparatus according to claim 1, wherein the object comprises a float.

27. Apparatus according to claim 1, wherein the object comprises a canopy.

28. Apparatus according to claim 1, wherein the pump has provision to provide treatment of the water delivered by the pump.

29. Apparatus according to claim 28 wherein the treatment comprises chlorination.

30. Apparatus according to claim 28, wherein the pump comprises an electrolytic cell to which current is supplied by a linear electric generator operable in response to reciprocation of the pump.

31. Apparatus according to claim 30 wherein linear electric generator comprises an armature defined by the piston of the pump and a stator associated with the armature, reciprocation of the piston providing the relative movement between the armature and the stator to generate an electrical current.

32. Apparatus according to claim 30, further comprising control means for controlling the amount of treatment applied to the water.

33. Apparatus according to claim 32 wherein the control means comprises a regulator for regulating the electric current provided to the electrolytic cell.

34. Apparatus for capturing wave energy in a body of water having a water surface, the apparatus comprising:

an object configured to respond to wave disturbances in the body of water, a reciprocating pump within the body of water, the reciprocating pump comprising:

a body defining a cavity, a buoyancy float provided on an upper end section of the body, wherein the buoyancy float comprises a bladder structure inflated by air, a piston slidably and sealingly mounted with respect to the body for reciprocal movement with respect to the cavity and the cavity cooperating to define a pumping chamber adapted to undergo expansion and contraction in response to reciprocal movement of the piston with respect to the cavity, a flow passage within the piston, the flow passage having an inlet for receiving water from the body of water, and an outlet for discharging the received water into the discharge chamber, whereby water is drawn into the pumping chamber upon volume expansion thereof and is discharged from the pumping chamber upon volume reduction thereof, the reciprocating pump being operably coupled to the object to be driven by upward movement of the object to undergo a first stroke.

35. Apparatus according to claim 34, wherein the bladder structure is so configured as to provide a righting moment to the pump.

36. Apparatus according to claim 35 wherein the bladder structure is of ellipsoidal configuration.

* * * * *